US012585048B2

(12) United States Patent　(10) Patent No.: US 12,585,048 B2

Ikeda et al.　(45) Date of Patent: Mar. 24, 2026

(54) DIFFUSION PLATE OF MICRO ARRAY TYPE

(71) Applicant: KURARAY CO., LTD., Kurashiki (JP)

(72) Inventors: Keisuke Ikeda, Kamisu (JP); Atsushi Uchida, Kamisu (JP); Masaru Karai, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 395 days.

(21) Appl. No.: 18/252,495

(22) PCT Filed: Nov. 16, 2021

(86) PCT No.: PCT/JP2021/042100

§ 371 (c)(1),
(2) Date: May 10, 2023

(87) PCT Pub. No.: WO2022/107772

PCT Pub. Date: May 27, 2022

(65) Prior Publication Data

US 2023/0400607 A1　Dec. 14, 2023

(30) Foreign Application Priority Data

Nov. 17, 2020　(JP) ................................. 2020-190843

(51) Int. Cl.
G02B 3/00　　(2006.01)
G02B 5/10　　(2006.01)
(52) U.S. Cl.
CPC ............. G02B 3/0056 (2013.01); G02B 5/10 (2013.01)

(58) Field of Classification Search
CPC ...... G02B 3/0056; G02B 5/10; G02B 3/0037; G02B 3/02; G02B 3/06; G02B 27/0927;
(Continued)

(56) References Cited

U.S. PATENT DOCUMENTS

2002/0145797 A1　10/2002　Sales
2007/0127131 A1　6/2007　Lissotschenko et al.
(Continued)

FOREIGN PATENT DOCUMENTS

CN　　1947053 A　　4/2007
CN　　109791232 A　　5/2019
(Continued)

OTHER PUBLICATIONS

International Search Report with English translation issued Feb. 8, 2022 in PCT/JP2021/042100 filed on Nov. 16, 2021, 4 pages.
(Continued)

*Primary Examiner* — James C. Jones
(74) *Attorney, Agent, or Firm* — Oblon, McClelland, Maier & Neustadt, L.L.P.

(57)　　　　ABSTRACT

Lenses are arrayed in a lattice on an array surface of a microlens array. A lens has a convex surface that is cylindrical throughout sections that are parallel to a lattice direction of the lens and are orthogonal to the array surface. In each of meridians of the sections parallel to the lattice direction of the lens, a sag amount is corrected so as to increase an inclination of a skirt. In another aspect, a lens has a concave surface that is cylindrical throughout sections that are parallel to a lattice direction of the lens and are orthogonal to an array surface. In each of meridians of the sections parallel to the lattice direction of the lens, a sag amount is corrected so as to increase an inclination of a rim.

14 Claims, 31 Drawing Sheets

(58) Field of Classification Search
CPC ............ G02B 27/0961; G02B 27/0977; G02B 27/48; G02B 5/02; G02B 5/0273; G02B 2003/0093; G03B 21/008; G03B 21/2033; G03B 21/62
See application file for complete search history.

(56) References Cited

U.S. PATENT DOCUMENTS

| | | | |
|---|---|---|---|
| 2018/0149860 A1 | 5/2018 | Tanaka | |
| 2019/0146237 A1 | 5/2019 | Uchida et al. | |
| 2020/0284952 A1 | 9/2020 | Uchida et al. | |

FOREIGN PATENT DOCUMENTS

| | | | | |
|---|---|---|---|---|
| JP | 2004-505306 A | | 2/2004 | |
| JP | 2006-58320 A | | 3/2006 | |
| JP | 2006058320 | * | 3/2006 | |
| JP | 2006058320 A | * | 3/2006 | |
| JP | 2010-145745 A | | 7/2010 | |
| JP | 2017-9669 A | | 1/2017 | |
| JP | 2017-21079 A | | 1/2017 | |
| WO | WO 02/10804 A1 | | 2/2002 | |
| WO | WO 2017/188225 A1 | | 11/2017 | |
| WO | WO2018/066501 A1 | | 4/2018 | |

OTHER PUBLICATIONS

Ushio Inc., "Example of Microfabrication," [online], Ushio Inc., [Accessed on Sep. 23, 2020], Internet <URL: https://www.ushio.co.jp/jp/feature/functional_device/part/>, 2 pages.

Matsushima, "Wave Field Tools," [online], Mar. 11, 2020, Kansai University, Faculty of Engineering, Science Optical Information System, [Accessed on Apr. 20, 2020], Internet <URL: http://www.laser.ee.kansai-u.ac.jp/WaveFieldTools/>, 1 page.

International Preliminary Report on Patentability and Written Opinion issued May 16, 2023, in PCT/JP2021/042100, (with English Translation), 11 pages.

Extended European Search Report issued Sep. 24, 2024 in European Patent Application No. 21894646.5, 11 pages.

Petrov, "Coherence and Polarization effects of light diffraction by microlens arrays", Proc. of SPIE, vol. 11146, Jun. 19, 2019, 9 pages, XP 060124623.

* cited by examiner

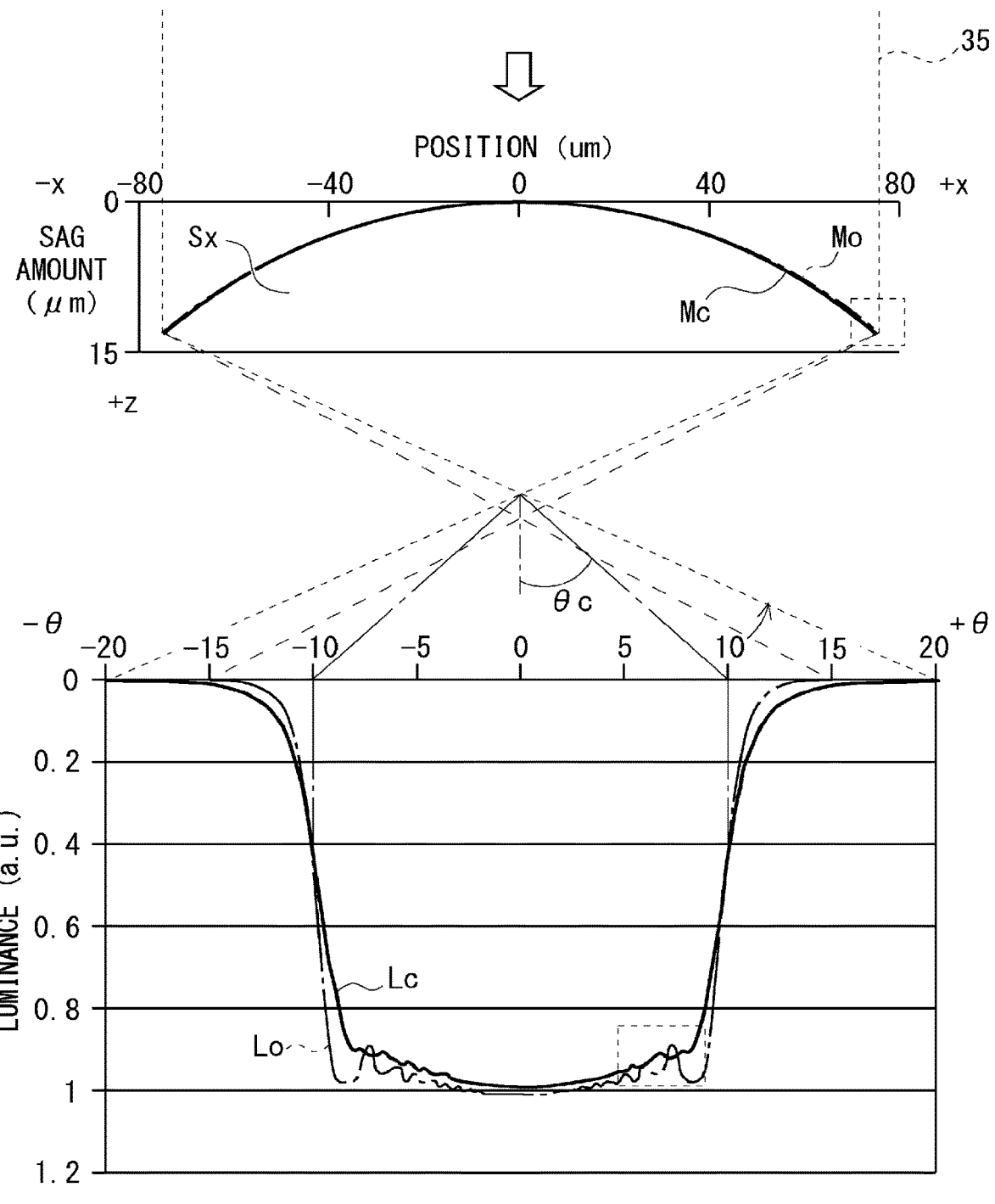
F i g.  4

Lo
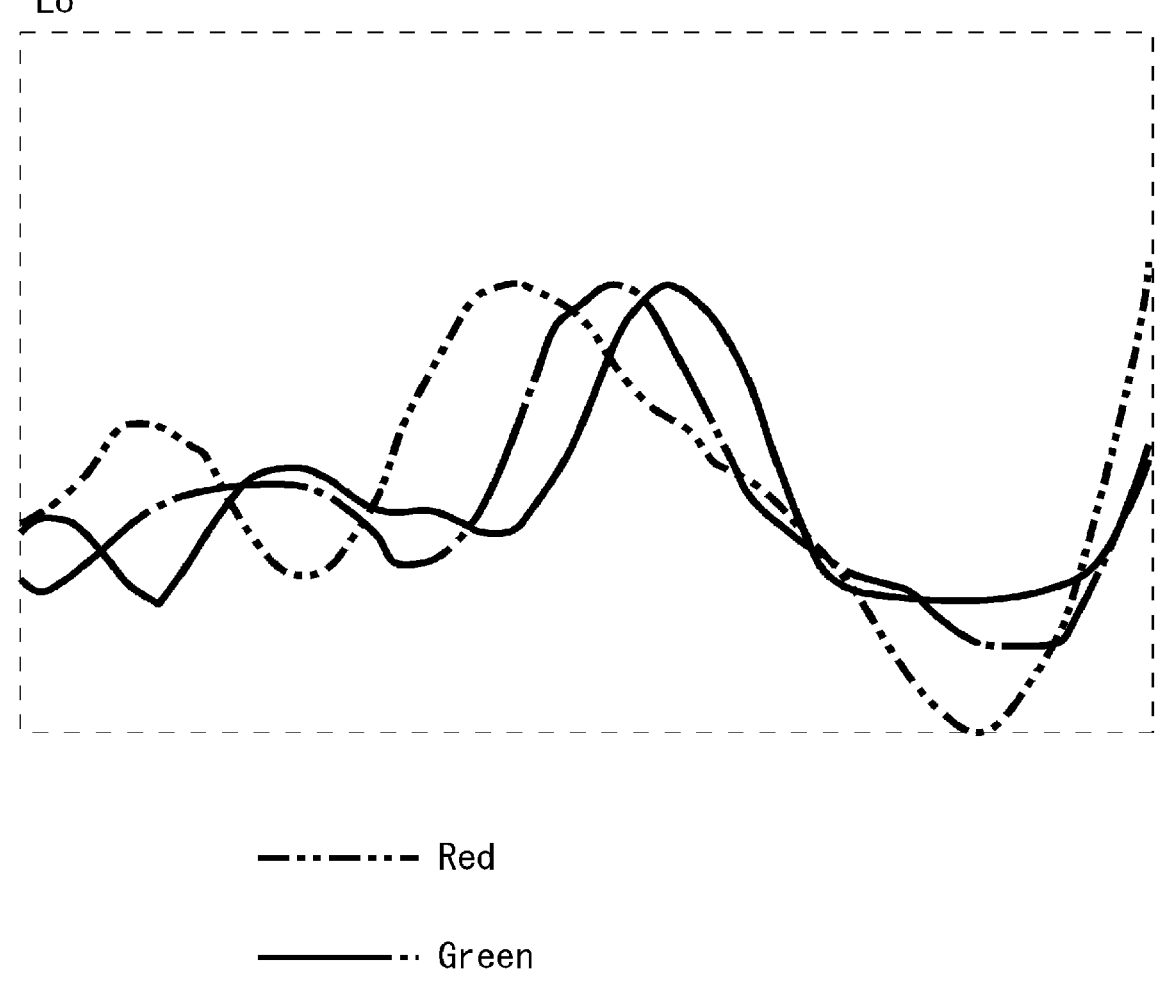
— - — - — ·· Red
———— ·· Green
———— Blue
F i g.  6

Lc

—··—···— Red

———··  Green

————— Blue

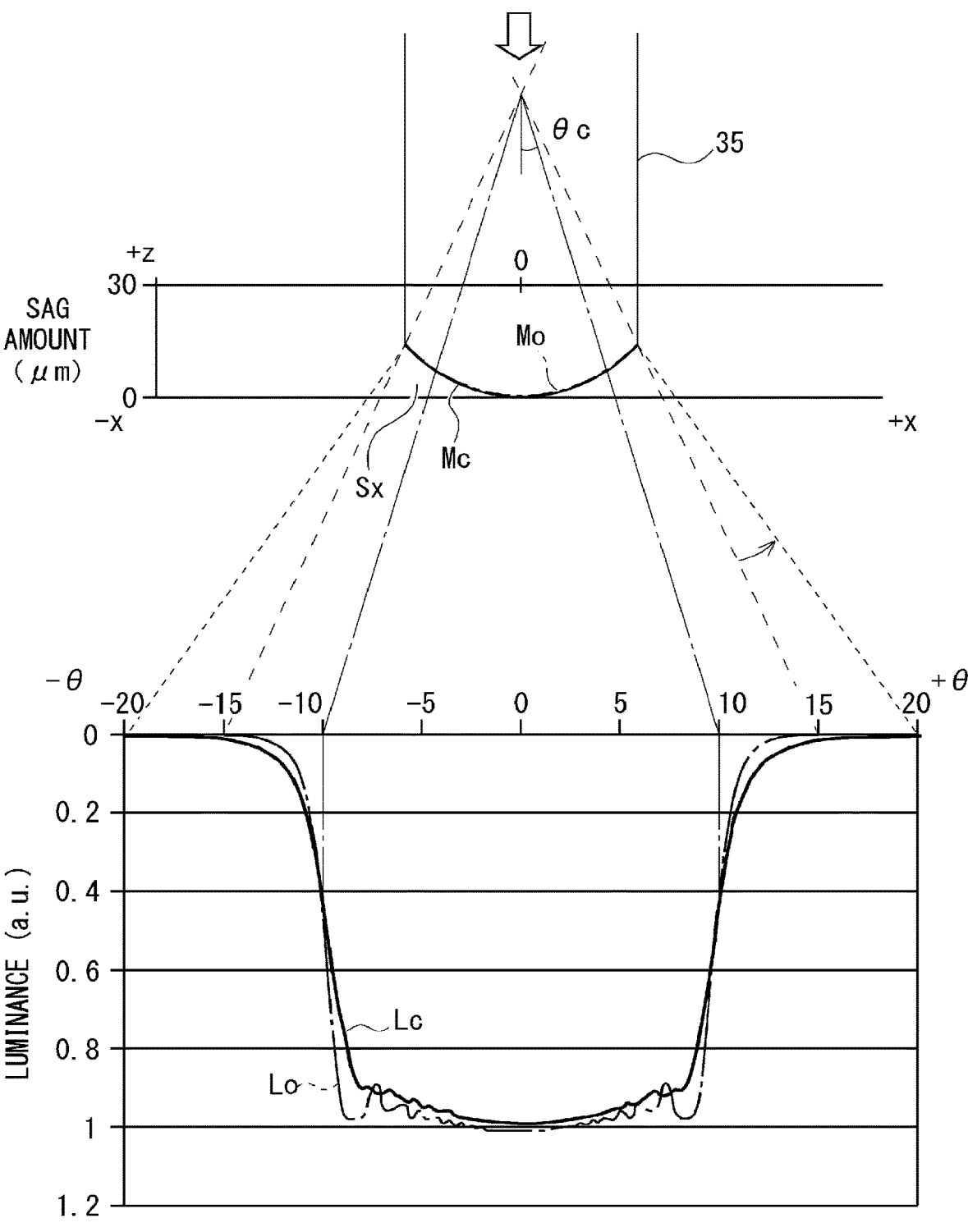
F i g.  23

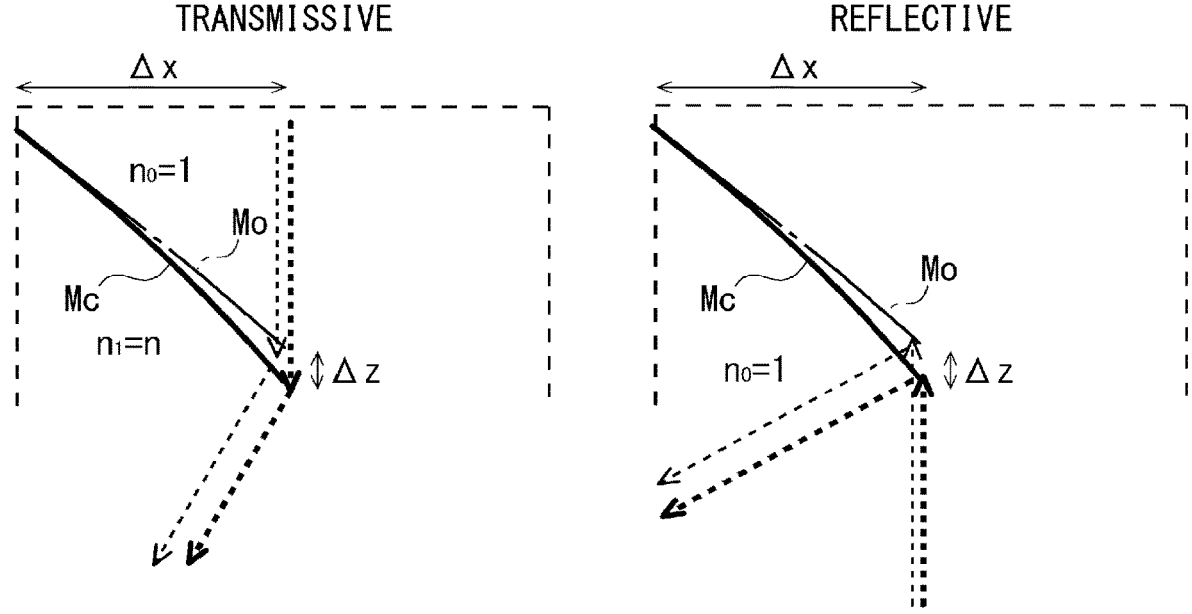
F i g.  25

NO CORRECTION

WITH CORRECTION

NO CORRECTION

NO CORRECTION

WITH CORRECTION

NO CORRECTION

WITH CORRECTION

DIFFUSION PLATE OF MICRO ARRAY TYPE

CROSS REFERENCE TO RELATED APPLICATIONS

This application is a National Stage entry under 35 U.S.C. § 371 of PCT/JP2021/042100, filed on Nov. 16, 2021, and claims priority to Japanese Patent Application No. 2020-190843, filed on Nov. 17, 2020, the entire contents of which are incorporated herein by reference.

TECHNICAL FIELD

The present invention relates to diffusion plates of a micro array type and relates, in particular, to a transmissive microlens array, a reflective convex micromirror array, and a reflective concave micromirror array.

BACKGROUND ART

Non Patent Literature 1 discloses some curve structures of microlens arrays. There is proposed a technique in which a diffusion plate that includes such a microlens array is adopted as a screen in a head-up display, a laser projector, or the like. The use of a microlens array provides an advantage of being able to suppress speckle noise, as compared to a case in which a diffusion plate of a translucent plate or frosted glass is used. Speckle noise refers to a bright portion that accidentally arises in such diffusion plates, owing to the microstructure and the randomness of placement.

For example, an image forming apparatus proposed in Patent Literature 1 includes a laser projector that, with laser light used as a light source, projects a video image formed of an array of a plurality of pixels and a diffusion plate constituted by a microlens array in which a plurality of microlenses are arrayed. The use of a microlens array allows incident light to be diffused appropriately and allows the necessary divergence angle to be designed flexibly.

Patent Literature 2 discloses, in paragraph [0023], a structured screen that allows control of elementary structures—that is, microstructures—that define the surface as well as control of a relative distribution of the elementary structures across the surface of a device. The control of the surface shape and the relative spatial arrangement is completely deterministic, in contrast with the existing technique that relies on the microstructures and the randomness of the placement.

CITATION LIST

Patent Literature

Patent Literature 1: Japanese Unexamined Patent Application Publication No. 2010-145745
Patent Literature 2: Published Japanese Translation of PCT International Publication for Patent Application, No. 2004-505306

Non Patent Literature

Non Patent Literature 1: Ushio Inc., "Example of Micro-fabrication," [online], Ushio Inc., [Accessed on Sep. 23, 2020], Internet <URL: https://www.ushio.co.jp/jp/feature/functional device/part/>
Non Patent Literature 2: Kyoji Matsushima, "Wave Field Tools," [online], Mar. 11, 2020, Kansai University, Faculty of Engineering, Science Optical Information System, [Accessed on Apr. 20, 2020], Internet <URL: http://www.laser.ee.kansai-u.ac.jp/WaveFieldTools/>

SUMMARY OF INVENTION

The inventors have found that when a microlens array is used as a screen, luminance unevenness arises in a video image projected on a microlens. The inventors have also found that similar luminance unevenness arises when a convex micromirror array or a concave micromirror array is used as a screen. The present invention is directed to providing a means for reducing luminance unevenness in such diffusion plates of a micro array type.

<1> A microlens array in which lenses are arrayed in a lattice on an array surface, wherein the lenses each have a convex surface that is cylindrical throughout sections that are parallel to a lattice direction of the lens and are orthogonal to the array surface, and a sag amount is corrected so as to increase an inclination of a skirt in each of meridians of the sections parallel to the lattice direction of the lens.

<2> A microlens array in which lenses are arrayed longitudinally and laterally on an array surface, wherein when a longitudinal direction and a lateral direction of an array of the lenses are regarded as a longitudinal direction and a lateral direction of a lens among the lenses, the lens has a cross-cylindrical convex lens surface composed of a combination of a convex surface that is cylindrical along the lateral direction throughout sections that are parallel to the longitudinal direction of the lens and are orthogonal to the array surface and a convex surface that is cylindrical along the longitudinal direction throughout sections that are parallel to the lateral direction of the lens and are orthogonal to the array surface, and a sag amount is corrected so as to increase an inclination of a skirt in each of meridians of the sections parallel to the longitudinal direction and of the sections parallel to the lateral direction.

<3> The microlens array according to <2>, wherein the meridians of the sections parallel to the longitudinal direction and of the sections parallel to the lateral direction are each composed of a conic curve of which the sag amount is corrected.

<4> The microlens array according to <3>, wherein in the following range of a horizontal coordinate x with its center on an axis of symmetry of the meridians, $$|x| \geq \frac{L}{2} - \Delta x \qquad \text{[Math. 1]}$$

a sag amount z is expressed as a conic curve corrected as indicated by the following equation, $$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^{\gamma} \Delta z \right) \qquad \text{[Math. 2]}$$

wherein, $\Delta x$ and $\Delta z$ are expressed as follows, $$\Delta x = 0.1 \alpha (\gamma + 1.2) \sqrt{\frac{0.75 \lambda r}{n - 1}} \qquad \text{[Math. 3]}$$

-continued $$\Delta z = \frac{\beta \lambda}{n - 1} \qquad \text{[Math. 4]}$$

L is a width of the meridians, r is a radius of curvature of the conic curve, k is a conic constant, $\alpha$ is a real number no smaller than 0.5 nor greater than 2, $\beta$ is a real number no smaller than 0.15 nor greater than 0.6, $\gamma$ is a real number no smaller than 1 nor greater than 10, $\lambda$ is a wavelength of a visible light ray, and n is an absolute refractive index of the lens.

<5> The microlens array according to <4>, wherein $\alpha$ is a real number no smaller than 0.9 nor greater than 1.1, $\beta$ is a real number no smaller than 0.25 nor greater than 0.35, and $\gamma$ is a real number no smaller than 2 nor greater than 10.

<6> The microlens array according to <4> or <5>, wherein $\lambda$ is 650 nm.

<7> The microlens array according to <4> or <5>, wherein $\lambda$ is 530 nm.

<8> The microlens array according to any one of <4> to <7>, wherein in the following range of the horizontal coordinate x, $$|x| < \frac{L}{2} - \Delta x \qquad \text{[Math. 5]}$$

the sag amount z is expressed as a conic curve that is not corrected, as indicated by the following equation.

$$z = \frac{(1/r) \cdot x^2}{1 + \sqrt{1 - (1 + k) \cdot (1/r)^2 \cdot x^2}} \qquad \text{[Math. 6]}$$

<9> The microlens array according to any one of <2> to <8>, wherein the lenses are each a rectangular lens, and a longitudinal direction and a lateral direction of the rectangular lens match the longitudinal direction and the lateral direction of the array of the lenses.

<10> The microlens array according to any one of <2> to <9>, wherein the convex lens surface has different divergence angles in the longitudinal direction and in the lateral direction.

<11> A microlens array in which lenses are arrayed in a lattice on an array surface, wherein the lenses each have a concave surface that is cylindrical throughout sections that are parallel to a lattice direction of the lens and are orthogonal to the array surface, and a sag amount is corrected so as to increase an inclination of a rim in each of meridians of the sections parallel to the lattice direction of the lens.

<12> A microlens array in which lenses are arrayed longitudinally and laterally on an array surface, wherein when a longitudinal direction and a lateral direction of an array of the lenses are regarded as a longitudinal direction and a lateral direction of a lens among the lenses, the lens has a cross-cylindrical concave lens surface composed of a combination of a concave surface that is cylindrical along the lateral direction throughout sections that are parallel to the longitudinal direction of the lens and are orthogonal to the array surface and a concave surface that is cylindrical along the longitudinal direction throughout sections that are parallel to the lateral direction of the lens and are orthogonal to the array surface, and a sag amount is corrected so as to increase an inclination of a rim in each of meridians of the sections parallel to the longitudinal direction and of the sections parallel to the lateral direction.

<13> A transmissive screen comprising:
the microlens array according to any one of <1> to <12>.

<14> A head-up display comprising:
the transmissive screen according to <13>.

<15> A concave micromirror array in which concave mirrors are arrayed in a lattice on an array surface, wherein the concave mirrors each have a concave surface that is cylindrical throughout sections that are parallel to a lattice direction of the concave mirror and are orthogonal to the array surface, and a sag amount is corrected so as to increase an inclination of a rim in each of meridians of the sections parallel to the lattice direction of the concave mirror.

<16> A concave micromirror array in which concave mirrors are arrayed longitudinally and laterally on an array surface, wherein when a longitudinal direction and a lateral direction of the concave mirrors are regarded as a longitudinal direction and a lateral direction of a concave mirror among the concave mirrors, the concave mirror has a cross-cylindrical concave surface composed of a combination of a concave surface that is cylindrical along the lateral direction throughout sections that are parallel to the longitudinal direction of the concave mirror and are orthogonal to the array surface and a concave surface that is cylindrical along the longitudinal direction throughout sections that are parallel to the lateral direction of the concave mirror and are orthogonal to the array surface, and a sag amount is corrected so as to increase an inclination of a rim in each of meridians of the sections parallel to the longitudinal direction and of the sections parallel to the lateral direction.

<17> The concave micromirror array according to <16>, wherein the meridians of the sections parallel to the longitudinal direction and of the sections parallel to the lateral direction are each composed of a conic curve of which the sag amount is corrected.

<18> The concave micromirror array according to <16> or <17>, wherein in the following range of a horizontal coordinate x with its center on an axis of symmetry of the meridians, $$|x| \geq \frac{L}{2} - \Delta x \qquad \text{[Math. 7]}$$

a sag amount z is expressed as a conic curve corrected as indicated by the following equation, $$z = \left( \frac{(1/r) \cdot x^2}{1 + \sqrt{1 - (1 + k) \cdot (1/r)^2 \cdot x^2}} + \left( \frac{x + \Delta x - L/2}{\Delta x} \right)^{\gamma} \Delta z \right) \qquad \text{[Math. 8]}$$

wherein, $\Delta x$ and $\Delta z$ are expressed as follows, $$\Delta x = 0.1 \alpha (\gamma + 1.2) \sqrt{0.375 \lambda r} \qquad \text{[Math. 9]}$$

$$\Delta z = \frac{\beta \lambda}{2} \qquad \text{[Math. 10]}$$

L is a width of the meridians, $\alpha$ is a real number no smaller than 0.5 nor greater than 2, $\beta$ is a real number no smaller than 0.15 nor greater than 0.6, γ is a real number no smaller than 1 nor greater than r is a radius of curvature of the conic curve, and λ is a wavelength of a visible light ray.

<19> The concave micromirror array according to <18>, wherein α is a real number no smaller than 0.9 nor greater than 1.1, β is a real number no smaller than 0.25 nor greater than 0.35, and γ is a real number no smaller than 2 nor greater than 10.

<20> A convex micromirror array in which convex mirrors are arrayed in a lattice on an array surface, wherein the convex mirrors each have a convex surface that is cylindrical throughout sections that are parallel to a lattice direction of the convex mirror and are orthogonal to the array surface, and a sag amount is corrected so as to increase an inclination of a skirt in each of meridians of the sections parallel to the lattice direction of the convex mirror.

<21> A convex micromirror array in which convex mirrors are arrayed longitudinally and laterally on an array surface, wherein when a longitudinal direction and a lateral direction of the convex mirrors are regarded as a longitudinal direction and a lateral direction of a convex mirror among the convex mirrors, the convex mirror has a cross-cylindrical convex surface composed of a combination of a convex surface that is cylindrical along the lateral direction throughout sections that are parallel to the longitudinal direction of the convex mirror and are orthogonal to the array surface and a convex surface that is cylindrical along the longitudinal direction throughout sections that are parallel to the lateral direction of the convex mirror and are orthogonal to the array surface, and a sag amount is corrected so as to increase an inclination of a skirt in each of meridians of the sections parallel to the longitudinal direction and of the sections parallel to the lateral direction.

<22> A reflective screen comprising:

one of the concave micromirror arrays according to <15> to <19> or the convex micromirror arrays according to <20> and <21>.

The present invention can reduce luminance unevenness in a video image projected onto a diffusion plate of a micro array type.

BRIEF DESCRIPTION OF DRAWINGS

FIG. 4 shows a section of a corrected lens and a luminance distribution.

FIG. 6 is an enlarged view of luminance curves.

FIG. 23 shows a section of a corrected lens and a luminance distribution.

FIG. 25 shows enlarged views of skirts.

DESCRIPTION OF EMBODIMENTS

<Microlens Array>

Figure 1:
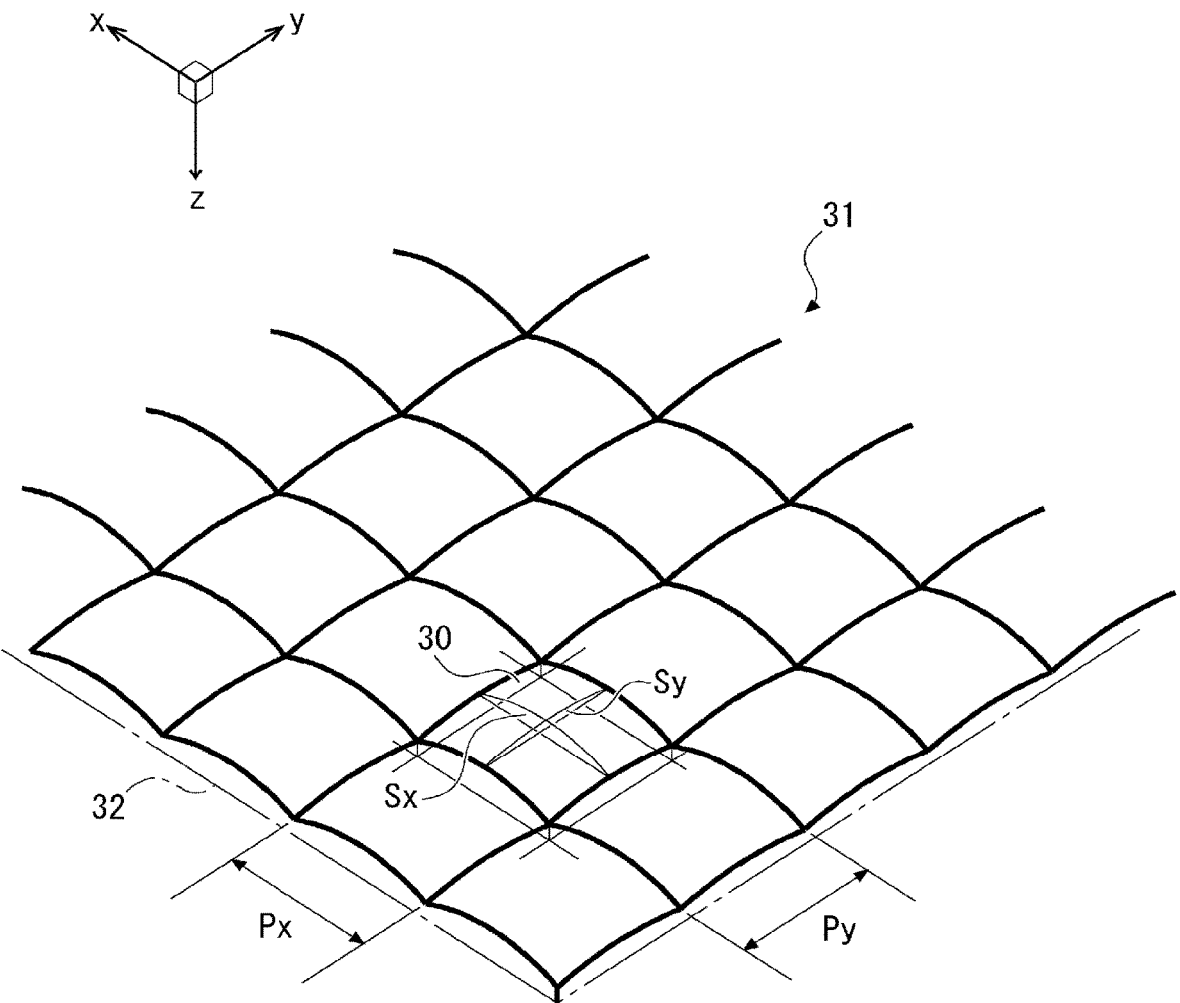
FIG. 1 is a perspective view of a microlens array.

FIG. 1 shows a microlens array 31 that includes a lens 30. For the sake of convenience, the y-axis direction in the drawing is regarded as a longitudinal direction, and the x-axis direction is regarded as a lateral direction. The direction in which a sag amount of the lens 30 increases is regarded as the z-axis direction. The microlens array 31 can be suitably used as a transmissive screen. Meanwhile, a transmissive screen can be suitably used in a head-up display.

Referring to FIG. 1, the microlens array 31 includes an array surface 32. Lenses 30 are arrayed repeatedly in the longitudinal direction and in the lateral direction on the array surface 32. The lenses 30 are rectangular lenses. The lenses 30 may instead be square lenses.

In FIG. 1, the longitudinal direction and the lateral direction of each rectangular lens 30 match the longitudinal direction and the lateral direction of the array of the lenses. A section Sy of the lens 30 is parallel to the longitudinal direction of the lens 30. A section Sx of the lens 30 is parallel to the lateral direction of the lens 30.

In FIG. 1, the pitch of the lens 30 in the longitudinal direction is denoted by Py. The pitch of the lens 30 in the lateral direction is denoted by Px. The pitch Py may be equal to the longitudinal dimension of the lens. The pitch Px may be equal to the lateral dimension of the lens.

Figure 2:
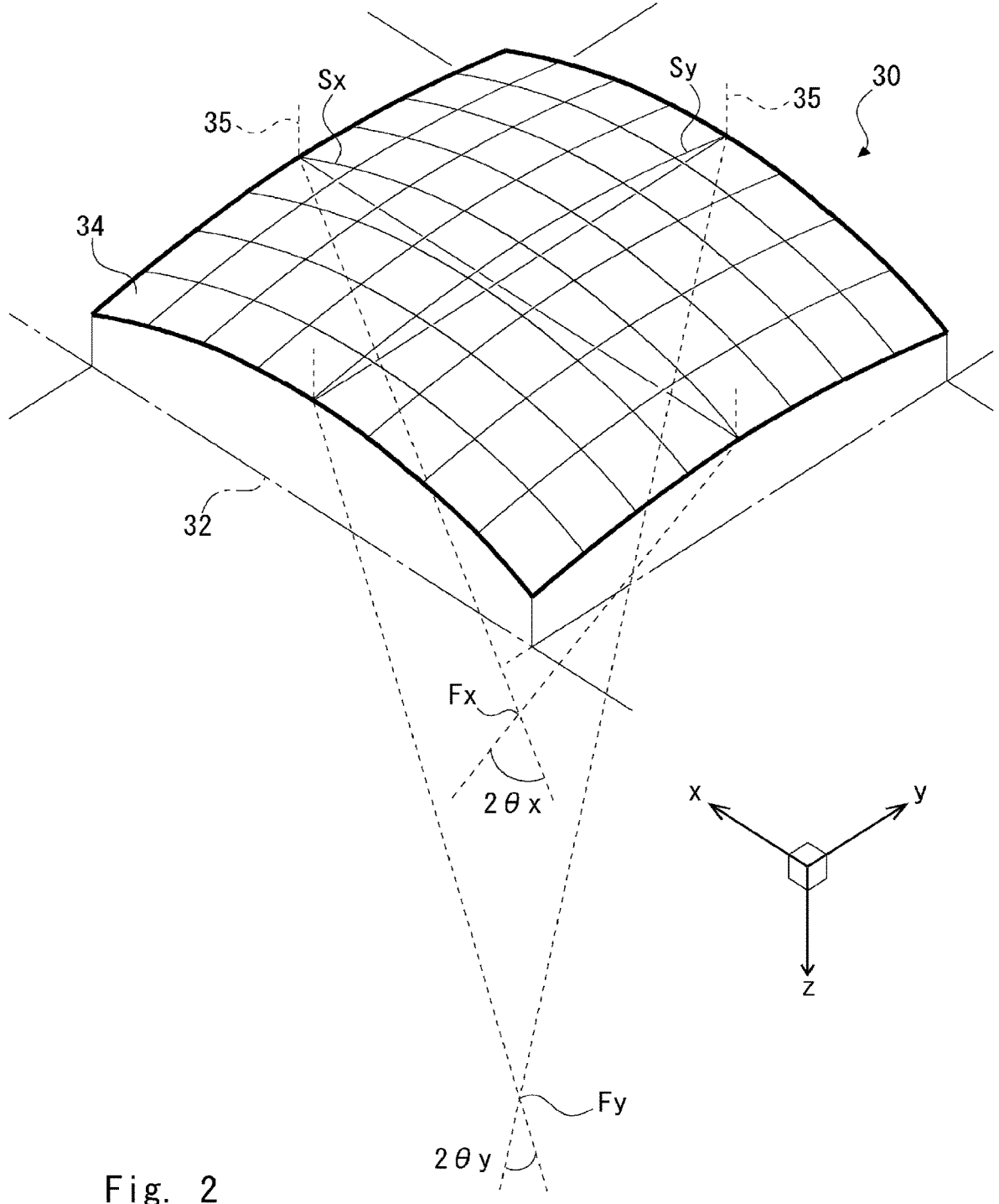
FIG. 2 is a perspective view of a microlens.

FIG. 2 shows a lens 30, which is one of the microlenses of a microlens array. The lens 30 includes a cross-cylindrical convex lens surface 34. The convex lens surface 34 is a convex surface that is cylindrical along the lateral direction and is also cylindrical along the longitudinal direction. In one aspect, the lens 30 is a plano-convex lens, of which only one side is convex. To be more specific, the convex lens surface 34 is cylindrical along the lateral direction throughout the section Sy and the other sections that are parallel to the longitudinal direction of the lens 30 and are orthogonal to the array surface 32. Furthermore, the convex lens surface 34 is cylindrical along the longitudinal direction throughout the section Sx and the other sections that are parallel to the lateral direction of the lens 30 and are orthogonal to the array surface 32. In one aspect, the term "cross-cylindrical" includes or does not include an elliptic paraboloid. In one aspect, the term "elliptic paraboloid" includes or does not include a paraboloid of revolution.

In the example shown in FIG. 2, the divergence angle of the convex lens surface 34 differs in the longitudinal direction and in the lateral direction. A beam 35 that travels orthogonal to the array surface 32 becomes incident on and is refracted at the convex lens surface 34. The beam 35 converges at a focal point Fx on the section Sx. The taper of the beam 35 that diverges after having converged is $2\theta x$.

As shown in FIG. 2, the beam 35 also converges at a focal point Fy on the section Sy. The taper of the beam 35 that diverges after having converged is $2\theta y$. In the aspect shown in FIG. 2, $2\theta x$ is greater than $2\theta y$. In another aspect, $2\theta x$ is smaller than $2\theta y$. In yet another aspect, $2\theta x$ is equal to $2\theta y$.

<Luminance Unevenness And Correction of Skirt>

Figure 3:
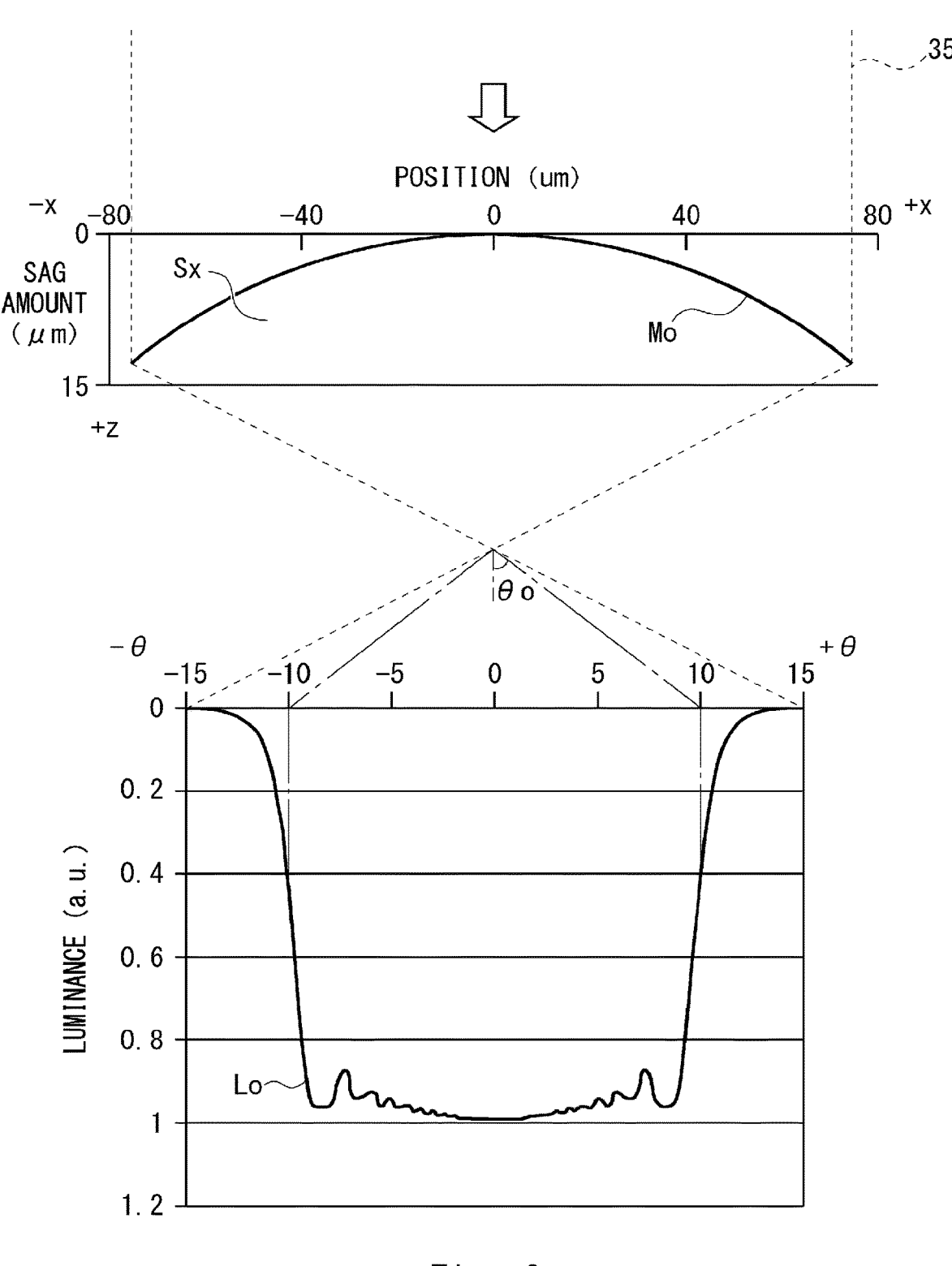
FIG. 3 shows a section of a reference lens and a luminance distribution.

FIG. 3 shows a section Sx of a lens and a luminance distribution. Unless specifically stated otherwise, a luminance distribution according to the present embodiment is a radiance distribution. The coordinate axis x represents the horizontal coordinate with its center on the axis of symmetry of the meridian of the section Sx. Light is assumed to become incident from the −z-direction in the drawing. A meridian Mo of the section Sx held before correction is a conic curve. A conic curve according to the present embodiment includes an ellipse, a parabola, and a hyperbola. An ellipse includes a circle. A conic curve does not include two straight lines. The term "conic curve" is construed in a similar manner, hereinafter. A lens having a meridian Mo and having not been corrected may be referred to as a reference lens.

In FIG. 3, a light beam 35 becomes incident on the lens. The beam 35 refracted at the convex lens surface 34 diverges. The angle $\theta$ of the refracted light rays is determined by the x-coordinate of the meridian. In the drawing, the angle $\theta$ is the angle of spread of the refracted light rays relative to the axis of symmetry of the meridian of the section Sx. In the drawing, the angle $\theta$ is indicated in positive and negative values, for the sake of convenience. The half width at half maximum (HWHM) of the luminance distribution of the refracted beam is the divergence angle $\theta o$ of the reference lens. In the drawing, the divergence angle $\theta o$ is 10 degrees. The taper of the diverging beam is $2\theta o$, which is 20 degrees. This taper is different from $2\theta x$ shown in FIG. 2.

In FIG. 3, shoulders of a luminance curve Lo lie near the points where the angle $\theta=\pm 10$ degrees. Ripples of the luminance curve that can cause luminance unevenness are observed around these shoulders.

FIG. 4 further shows a meridian Mc of a section Sx held after correction. A lens having a meridian Mc and having been corrected may be referred to as a corrected lens. In one aspect, the center portion of the meridian Mc is represented as a conic curve. A skirt of the meridian Mc is represented by a corrected conic curve. Herein, a skirt refers to the vicinity of an edge of a convex lens shape.

In FIG. 4, the half width at half maximum of the luminance distribution of the beam 35 that has passed through the corrected lens is the divergence angle $\theta c$. In the drawing, $\theta c$ is 10 degrees. The taper of the diverging beam 35 is $2\theta c$, which is 20 degrees.

Figure 5:
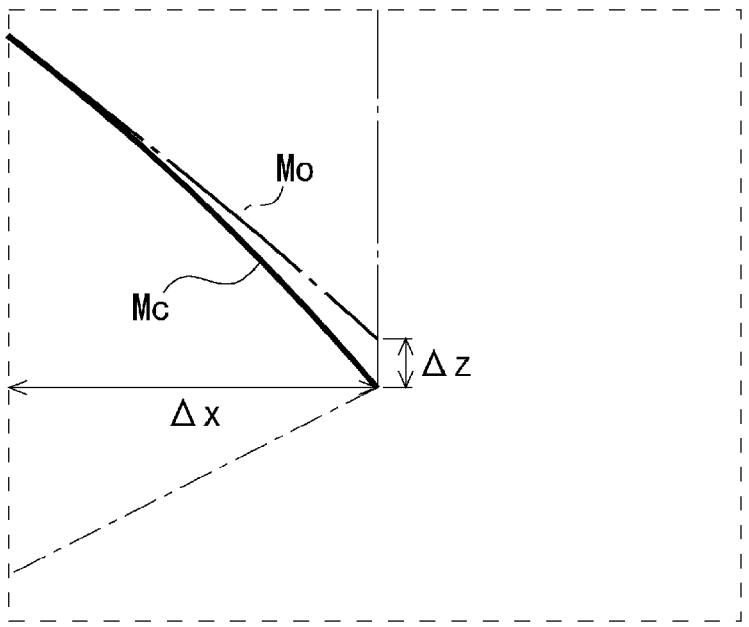
FIG. 5 is an enlarged view of a skirt.

FIG. 5 is an enlarged view of a skirt of a meridian. A skirt of a meridian Mc falls slightly in the +z-direction, as compared to a skirt of a meridian Mo. The size of the range in the horizontal direction in which the sag amount is corrected is denoted by $\Delta x$. The correction amount of the sag amount is denoted by $\Delta z$. In this manner, the sag amount is corrected so as to increase the inclination of the skirt of the meridian of the section Sx.

Referring back to FIG. 4, FIG. 4 shows a change in the luminance distribution before and after correction. In FIG. 4, shoulders of a luminance curve Lc lie near the points where the angle $\theta=\pm 10$ degrees. Ripples of the luminance curve that can cause luminance unevenness are observed around these shoulders. However, the vibrations, that is, the ripples of the luminance are alleviated in the luminance curve Lc, as compared to those in the luminance curve Lo.

FIG. 6 shows the luminance curve Lo in an enlarged manner. The ripples along the x-coordinate are large in each of Red, Green, and Blue. Therefore, an observer observing the microlens finds luminance unevenness. Furthermore, the fact that the peak differs in different colors indicates that this lens has chromatic aberration.

Figure 7:
FIG. 7 is an enlarged view of luminance curves.

FIG. 7 shows the luminance curve Lc in an enlarged manner. The ripples are reduced through the correction of the sag amount in each of Red, Green, and Blue. Therefore, an observer observing the microlens does not easily find luminance unevenness. Furthermore, the chromatic aberration is reduced through the correction of the sag amount.

The sag amount is corrected at each section parallel to the section Sx such as the one shown in FIG. 2. Therefore, the luminance unevenness is reduced throughout in the longitudinal direction, that is, throughout in the y-axis direction. The sag amount is corrected also at each section parallel to the section Sy such as the one shown in FIG. 2. Therefore, the luminance unevenness is reduced throughout in the lateral direction, that is, throughout in the x-axis direction. According to the present embodiment, the meridians of the sections parallel to the longitudinal direction and the meridians of the sections parallel to the lateral direction are each composed of a conic curve whose sag amount is corrected.

<Analysis of Ripple>

Figure 8:
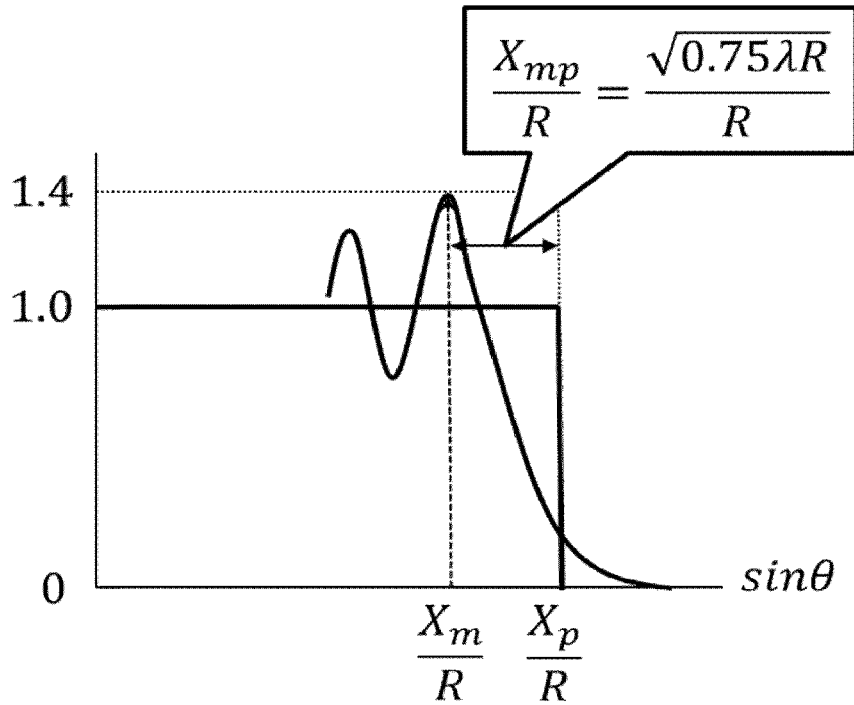
FIG. 8 shows a luminance distribution of emission light.

A method of correction will be described below. First, a ripple that is to be reduced through correction will be described. FIG. 8 shows, through a luminance distribution of emission light, the directionality characteristics of the luminance distribution. The vertical axis represents the luminance. The graph shown in FIG. 8 is vertically inverted from the graph shown in FIG. 4. The horizontal axis represents sin $\theta$ with respect to the angle $\theta$. The dashed line indicates the center of the swing width of the luminance. $X_m$ is the x-coordinate on the lens at which the peak of the outermost ripple appears. $X_p$ is the x-coordinate of the edge of the lens. The distance $X_{mp}$ from $X_m$ to $X_p$ is expressed by the following equation.

$$X_{mp} = \sqrt{0.75\lambda R} \qquad \text{[Math. 11]}$$

In the equation, $\lambda$ is the wavelength of incident light. In the equation, R is the focal length of the lens.

In a case in which visible light is projected onto a microlens, in one aspect, the range of the wavelength $\lambda$ is from 400 (nm) to 700 (nm). It is ideal that the conditions indicated with use of some numerical formulas below be satisfied in the entire visible light range. Furthermore, analyzing a ripple with a representative wavelength selected for the sake of convenience is effective in reducing luminance unevenness in the entire visible light range. In one aspect, a ripple is analyzed with a green wavelength yielding a high luminous efficacy—for example, 530 nm—used as $\lambda$. In another aspect, a ripple is analyzed with a red wavelength at which luminance unevenness caused by a diffraction phenomenon is less noticeable—for example, 650 nm—used as $\lambda$. This aspect is effective in a case in which the luminance unevenness is not prominent in the other visible light ranges. In another aspect, a ripple is analyzed with a yellow wavelength that is halfway between the green wavelength and the red wavelength—for example, 590 nm—used as $\lambda$.

<Reference Lens>

Figure 9:
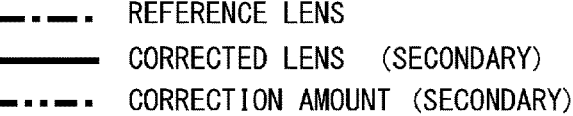
FIG. 9 is a graph of a sag amount and a correction amount.
Figure 9:
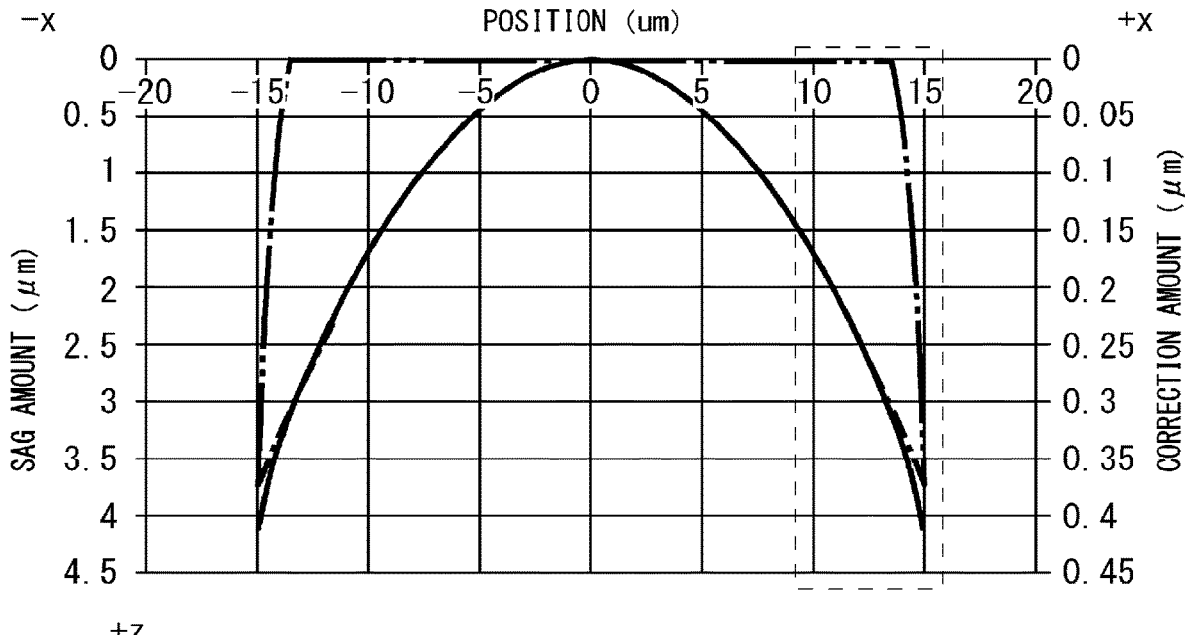
Figure 10:
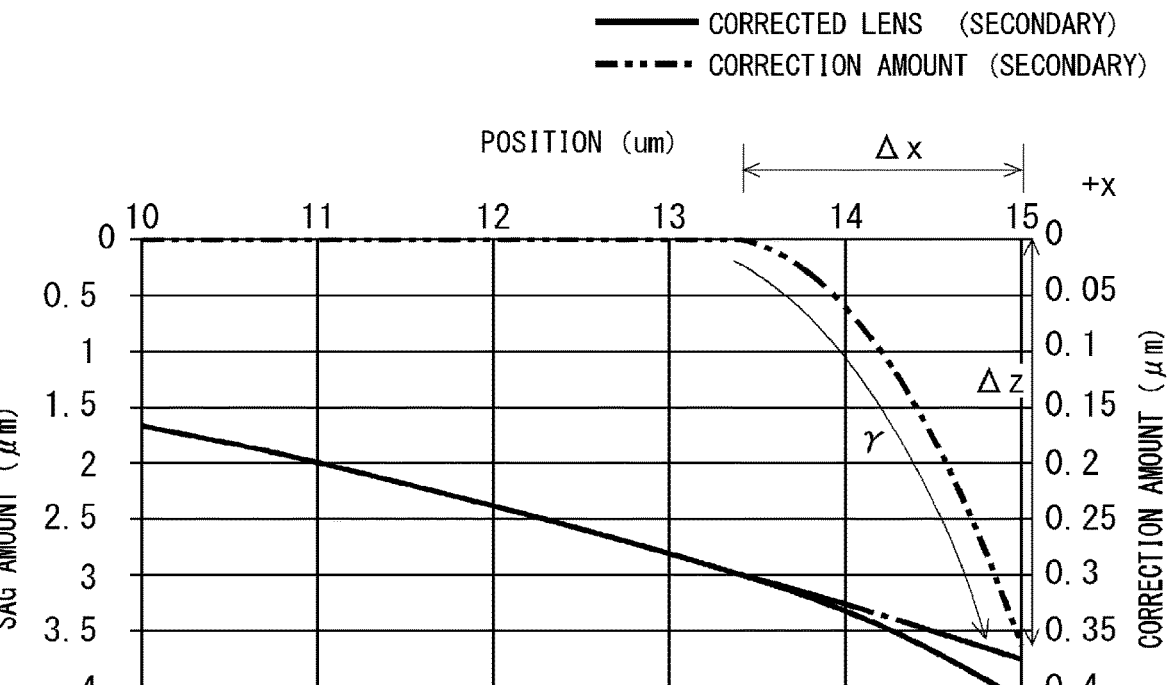
FIG. 10 is a graph of a sag amount and a correction amount near a skirt.

Next, correction of a sag amount will be described with reference to FIGS. 9 and 10. FIG. 9 shows the entirety of the graph of a sag amount and a correction amount. FIG. 10 is a graph of the sag amount and the correction amount near the skirt. First, the reference lens in the graph will be described. The sag amount z of the reference lens is expressed as a conic curve that is not corrected, as indicated by the following equation, in which k is the conic constant, and r is the radius of curvature of the conic curve.

$$z = \frac{(1/r) \cdot x^2}{1 + \sqrt{1 - (1+k) \cdot (1/r)^2 \cdot x^2}} \qquad \text{[Math. 12]}$$

<Method of Correction>

Next, with reference to FIGS. 9 and 10, a method of correction will be described. First, the center of a lens that is not corrected will be described. In the following range of the x-coordinate in the horizontal direction, the sag amount z is expressed as a conic curve that is not corrected, as indicated by the equation above.

$$|x| < \frac{L}{2} - \Delta x \qquad \text{[Math. 13]}$$

Meanwhile, it is preferable that the correction performed at the skirt in FIGS. 9 and 10 be performed in the following range of the x-coordinate in the horizontal direction with its center on the axis of symmetry of the meridian.

$$|x| \geq \frac{L}{2} - \Delta x \qquad \text{[Math. 14]}$$

L is the width of the meridian, that is, the diameter of the lens. In the aspect, the diameter L of the lens is equal to the pitch of the lens. In FIGS. 9 and 10, the size $\Delta x$ of the range in the horizontal direction in which the sag amount is corrected is expressed as follows.

$$\Delta x = \alpha \times 0.1(\gamma + 1.2)\sqrt{\frac{0.75\lambda r}{n-1}} \qquad \text{[Math. 15]}$$

In the above, $\alpha$ is the correction width factor. Preferably, $0 < \alpha < 2$ holds; preferably, $0.5 < \alpha < 1.5$ holds; preferably, $0.7 < \alpha < 1.3$ holds; preferably, $0.9 < \alpha < 1.1$ holds; or preferably, $\alpha = 1.0$ holds.

In the above, $\gamma$ is a real number representing the order of correction. Preferably, $1 \leq \gamma \leq 10$ holds; preferably, $2 < \gamma$ holds; or preferably, $3 < \gamma$ holds. The skirt becomes a straight line when $\gamma = 1$.

In the above, $\lambda$ is the wavelength of the light rays.

In the above, r is the radius of curvature of the conic curve.

In the above, n is the absolute refractive index of the lens, and n is approximated by the relative refractive index of the lens with respect to the air.

Herein, the square root below corresponds to $X_{mp}$ shown in FIG. 7.

$$\sqrt{\frac{0.75\lambda r}{n-1}} \qquad \text{[Math. 16]}$$

The correction amount $\Delta z$ of the sag amount shown in FIGS. 9 and 10 is expressed as follows.

$$\Delta z = \frac{\beta\lambda}{n-1} \qquad \text{[Math. 17]}$$

In the above, $\beta$ is the correction coefficient for converting the optical path difference in the wavelength unit. Preferably, $0 < \beta < 0.6$ holds; preferably, $0.15 < \beta < 0.45$ holds; preferably, $0.2 < \beta < 0.4$ holds; preferably, $0.25 < \beta < 0.35$ holds; or preferably, $\beta = 0.3$ holds.

In FIGS. 9 and 10, the sag amount z is expressed as a conic curve corrected as indicated by the following equation.

$$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^\gamma \Delta z \right) \qquad \text{[Math. 18]}$$

Example 1: Transmissive Screen, Microlens Array

The microlens array 31 shown in FIG. 1 was designed on a computer, and its optical properties were examined simulatively through computation. A wave optics computation assisting tool kit "Wave Field Library" was used for the simulation. See Non Patent Literature 2.

Example 1-1

In order to examine the correction width factor $\alpha$ described above, a lens 30 such as the one shown in FIG. 2 was designed. The pitch Px and the pitch Py were each set to 30 μm. On the section Sy parallel to the longitudinal direction of the lens 30, the divergence angle $\theta$o of the beam 35 of the lens 30 that was not corrected was set to 10 degrees. On the section Sx parallel to the lateral direction of the lens 30, the divergence angle $\theta$o of the beam 35 of the lens 30 that was not corrected was set to 20 degrees. The lens 30 causes the beam to diverge more widely in the lateral direction than in the longitudinal direction.

Figure 11:
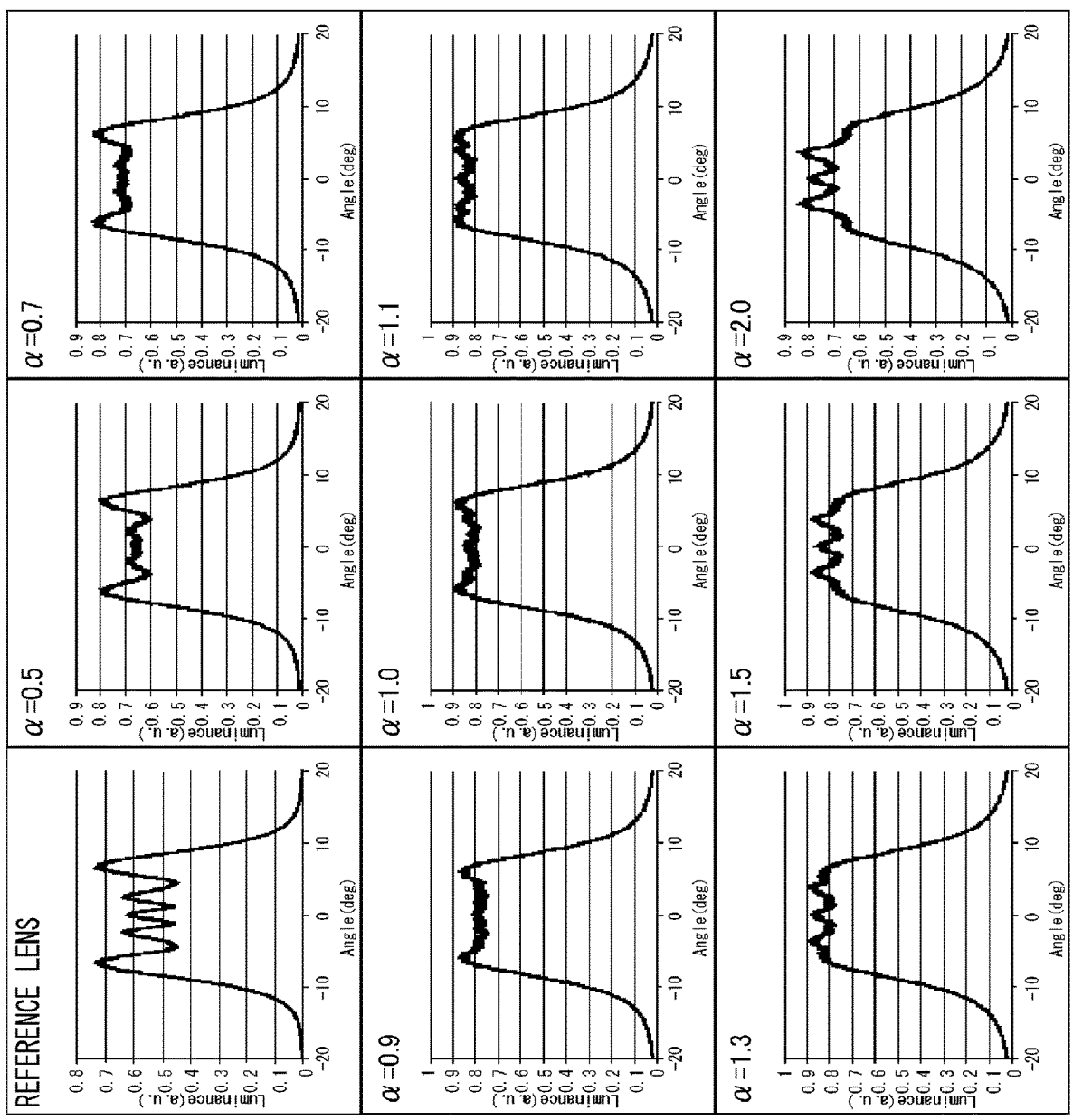
FIG. 11 shows luminance distributions in a longitudinal direction.

FIG. 11 shows graphs of the luminance at the section Sy in the longitudinal direction shown in FIGS. 2 and 3. In the graphs, the luminance is shown along the vertical axis, and the angle of refracted light is shown along the horizontal axis. The vertical axis represents the luminance labeled as Luminance (a.u.). The horizontal axis is labeled as Angle (deg) indicating the angle $\theta$. As shown in FIG. 3, the angle $\theta$ is the angle of spread of the refracted light rays. This applies in a similar manner below, unless specifically stated otherwise.

The graph in the upper left of FIG. 11 is a graph of a reference lens. The sag amount z of the reference lens is expressed as a conic curve that is not corrected, as indicated by the following equation. This applies in a similar manner below, unless specifically stated otherwise.

$$z = \frac{(1/r) \cdot y^2}{1 + \sqrt{1 - (1+k) \cdot (1/r)^2 \cdot y^2}} \qquad \text{[Math. 19]}$$

The radius of curvature r is 40 μm. The conic constant k is −1.0. The wavelength λ is 630 nm.

In FIG. 11, the eight other graphs are graphs of corrected lenses. Referring back to FIG. 9, correction at a skirt will be described. In this discussion, the x-axis in FIG. 9 is replaced by the y-axis. In the following range corresponding to a skirt of a corrected lens, $$|y| \geq \frac{L}{2} - \Delta y \qquad \text{[Math. 20]}$$

the sag amount z is expressed as a conic curve corrected as indicated by the following equation.

$$z = \left( \frac{(1/r) \cdot y^2}{1 + \sqrt{1 - (1+k) \cdot (1/r)^2 \cdot y^2}} + \left( \frac{y + \Delta y - L/2}{\Delta y} \right)^4 \Delta z \right) \qquad \text{[Math. 21]}$$

Herein, Δy and Δz are expressed as follows.

$$\Delta y = \alpha \times 0.52 \sqrt{\frac{0.75 \lambda r}{n - 1}} \qquad \text{[Math. 22]}$$

$$\Delta z = \frac{0.3\lambda}{n - 1} \qquad \text{[Math. 23]}$$

The diameter L of the lens is equal to the pitch Py shown in FIG. 2, and the value of the diameter L of the lens is 30 μm. The order of correction γ described above is fixed at 4. The correction width factor α is from 0.5 to 2.0. The absolute refractive index n is 1.5. The correction coefficient β described above is fixed at 0.3. The sag amount z at a portion that is not corrected is expressed as a conic curve that is identical to the conic curve of the reference lens.

In FIG. 11, the ripples decrease as the correction width factor α increases. However, the ripples start to increase again at around α=1.0.

Figure 12:
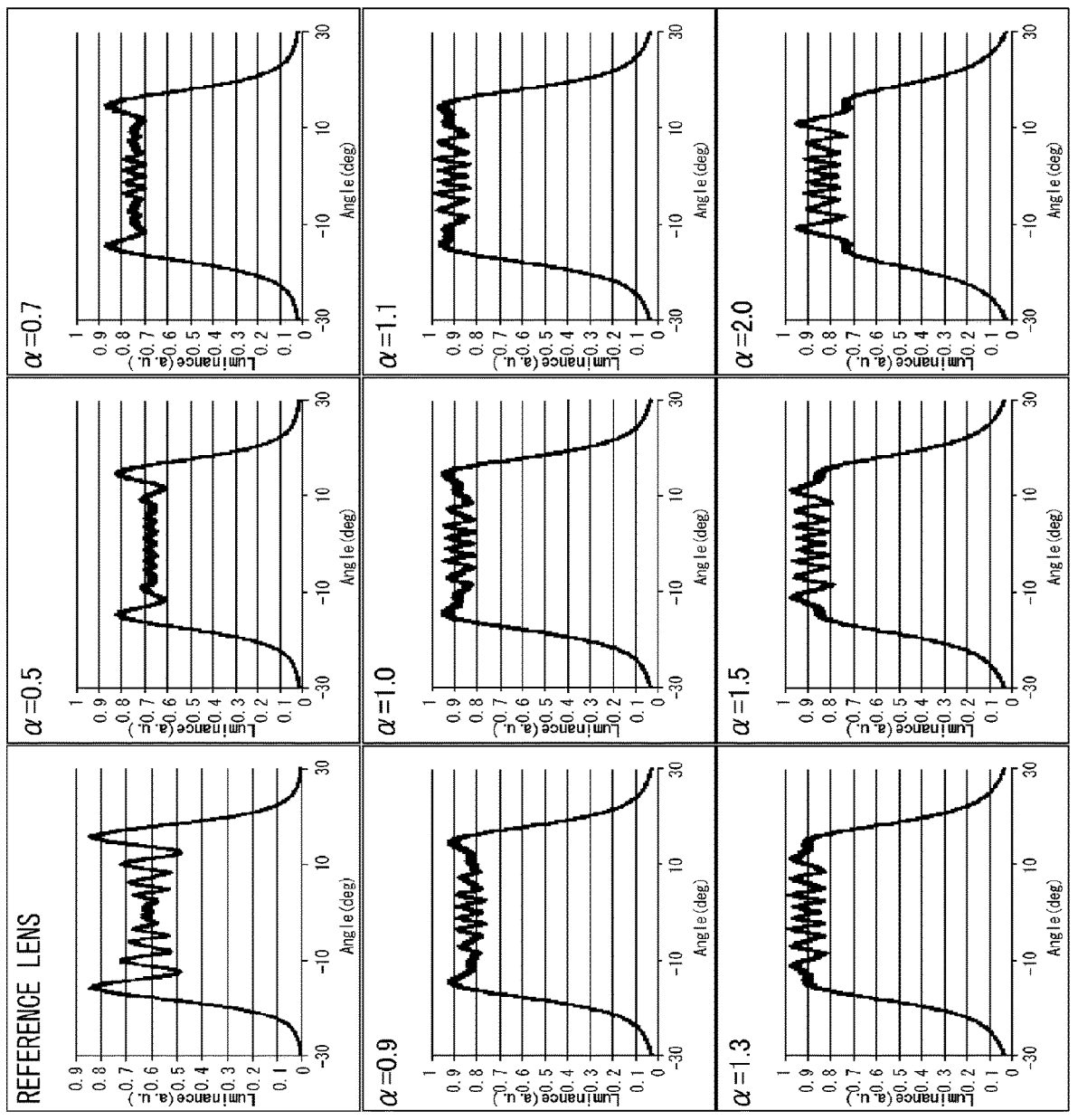
FIG. 12 shows luminance distributions in a lateral direction.

FIG. 12 shows graphs of the luminance at the section Sx in the longitudinal direction shown in FIGS. 2 and 3. In the graphs, the luminance is shown along the vertical axis, and the angle of refracted light is shown along the horizontal axis.

The graph in the upper left of FIG. 12 is a graph of a reference lens. The sag amount z of the reference lens is expressed as a conic curve that is not corrected, as indicated by the following equation.

$$z = \frac{(1/r) \cdot x^2}{1 + \sqrt{1 - (1+k) \cdot (1/r)^2 \cdot x^2}} \qquad \text{[Math. 24]}$$

The radius of curvature r is 20 μm. The conic constant k is −1.0. The wavelength λ is 630 nm.

In FIG. 12, the eight other graphs are graphs of corrected lenses. Referring back to FIG. 9, correction at a skirt will be described. In the following range corresponding to a skirt of a corrected lens, $$|x| \geq \frac{L}{2} - \Delta x \qquad \text{[Math. 25]}$$

the sag amount z is expressed as a conic curve corrected as indicated by the following equation.

$$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^4 \Delta z \right) \qquad \text{[Math. 26]}$$

Herein, Δx and Δz are expressed as follows.

$$\Delta x = \alpha \times 0.52 \sqrt{\frac{0.75 \lambda r}{n - 1}} \qquad \text{[Math. 27]}$$

$$\Delta z = \frac{0.3\lambda}{n - 1} \qquad \text{[Math. 28]}$$

The diameter L of the lens is equal to the pitch Px shown in FIG. 2, and the value of the diameter L of the lens is 30 μm. The order of correction γ described above is fixed at 4. The correction width factor α is from 0.5 to 2.0. The absolute refractive index n is 1.5. The correction coefficient β described above is fixed at 0.3. The sag amount z at a portion that is not corrected is expressed as a conic curve that is identical to the conic curve of the reference lens.

In FIG. 12, the ripples decrease as the correction width factor α increases. However, the ripples start to increase again at around α=1.0.

Figure 13:
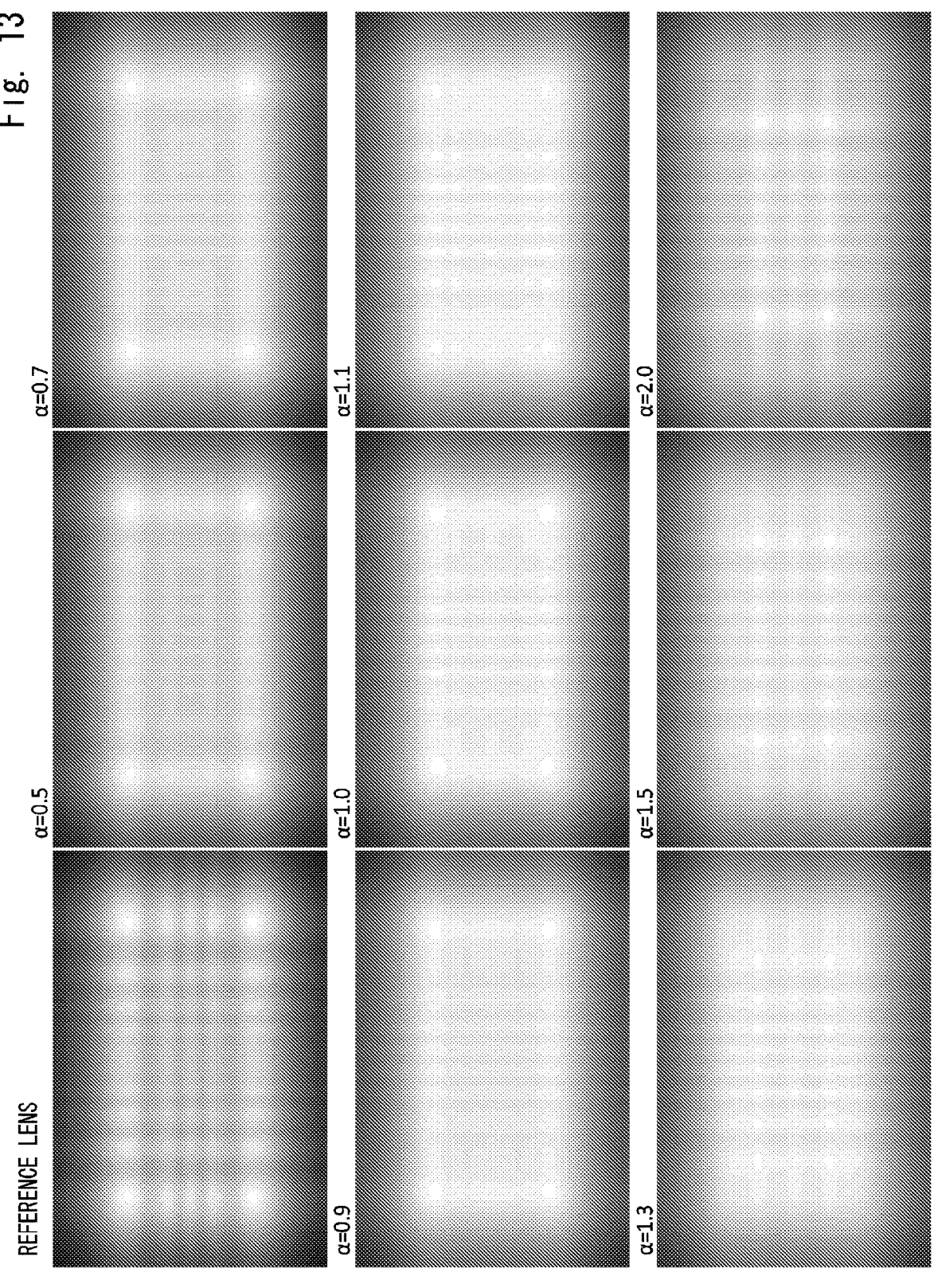
FIG. 13 shows simulations of observation images.

FIG. 13 shows simulations of observation images, as the microlens array is viewed in plan view. This shows that the unevenness in the luminance is reduced at around α=1.0 in both the longitudinal direction and the lateral direction of different divergence angles.

Example 1-2

In order to example the correction coefficient β described above, a lens was designed in a manner similar to that of <Example 1-1>.

Figure 14:
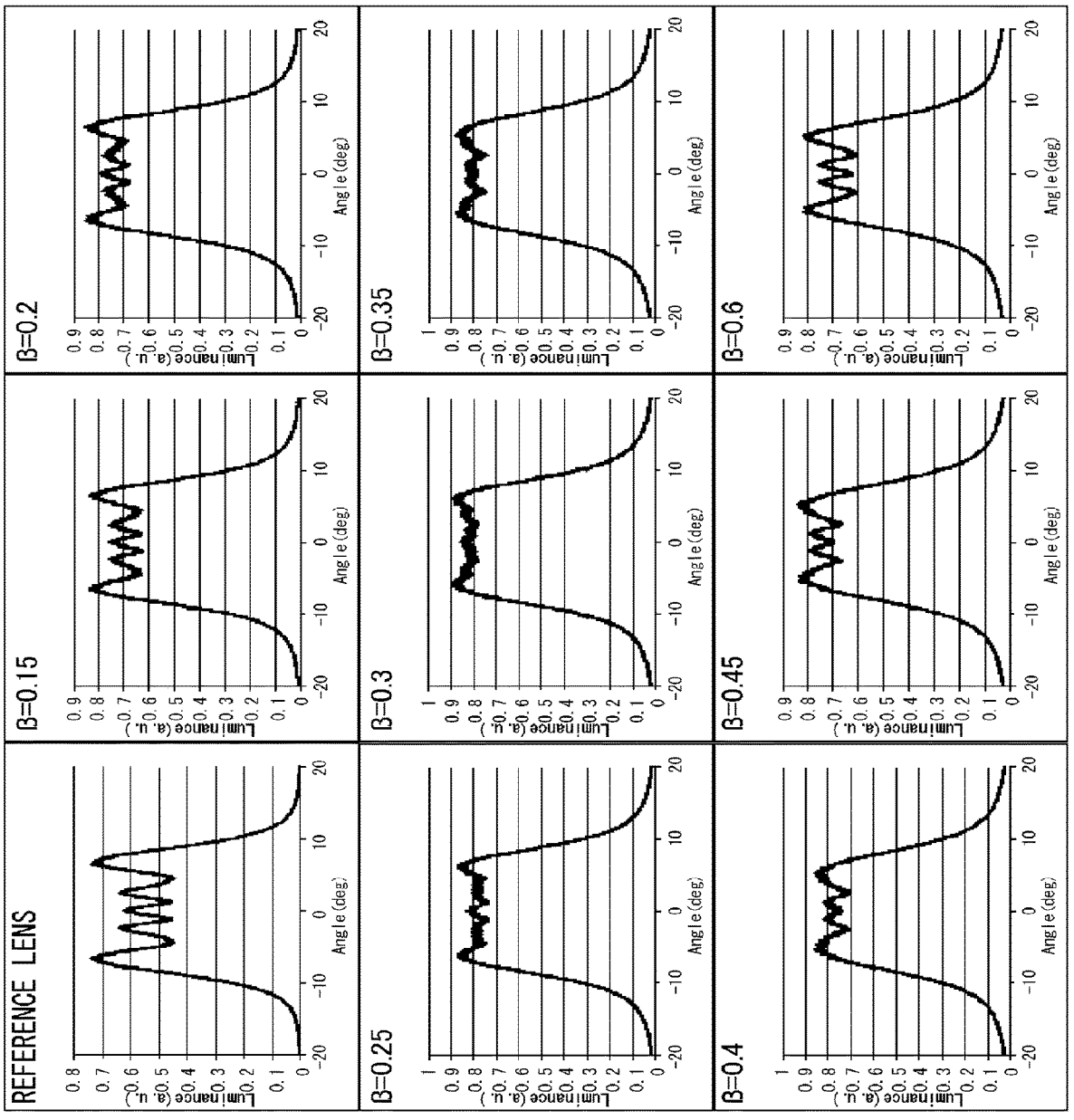
FIG. 14 shows luminance distributions in a longitudinal direction.

FIG. 14 shows graphs of the luminance at the section Sy in the longitudinal direction shown in FIGS. 2 and 3. In the graphs, the luminance is shown along the vertical axis, and the angle of refracted light is shown along the horizontal axis.

The graph in the upper left of FIG. 14 is a graph of a reference lens. This reference lens is identical to the reference lens described with reference to FIG. 11. The radius of curvature r, the conic constant k, and the wavelength λ are as described with reference to FIG. 11.

In FIG. 14, the eight other graphs are graphs of corrected lenses. Referring back to FIG. 9, correction at a skirt will be described. In this discussion, the x-axis in FIG. 9 is replaced by the y-axis. In the following range corresponding to a skirt of a corrected lens, $$|y| \ge \frac{L}{2} - \Delta y \qquad \text{[Math. 29]}$$

the sag amount z is expressed as a conic curve corrected as indicated by the following equation.

$$z = \left( \frac{(1/r) \cdot y^2}{1 + \sqrt{1 - (1+k) \cdot (1/r)^2 \cdot y^2}} + \left( \frac{y + \Delta y - L/2}{\Delta y} \right)^4 \Delta z \right) \qquad \text{[Math. 30]}$$

Herein, $\Delta y$ and $\Delta z$ are expressed as follows.

$$\Delta x = 0.52 \sqrt{\frac{0.75 \lambda r}{n-1}} \qquad \text{[Math. 31]}$$

$$\Delta z = \frac{\beta \lambda}{n-1} \qquad \text{[Math. 32]}$$

The diameter L of the lens is equal to the pitch Py shown in FIG. 2, and the value of the diameter L of the lens is 30 μm. The order of correction $\gamma$ described above is fixed at 4. The correction width factor $\alpha$ described above is fixed at 1. The absolute refractive index n is 1.5. The correction coefficient $\beta$ is from 0.15 to 0.6. The sag amount z at a portion that is not corrected is expressed as a conic curve that is identical to the conic curve of the reference lens.

In FIG. 14, the ripples decrease as the correction coefficient $\beta$ increases. However, the ripples start to increase again at around (3=

Figure 15:
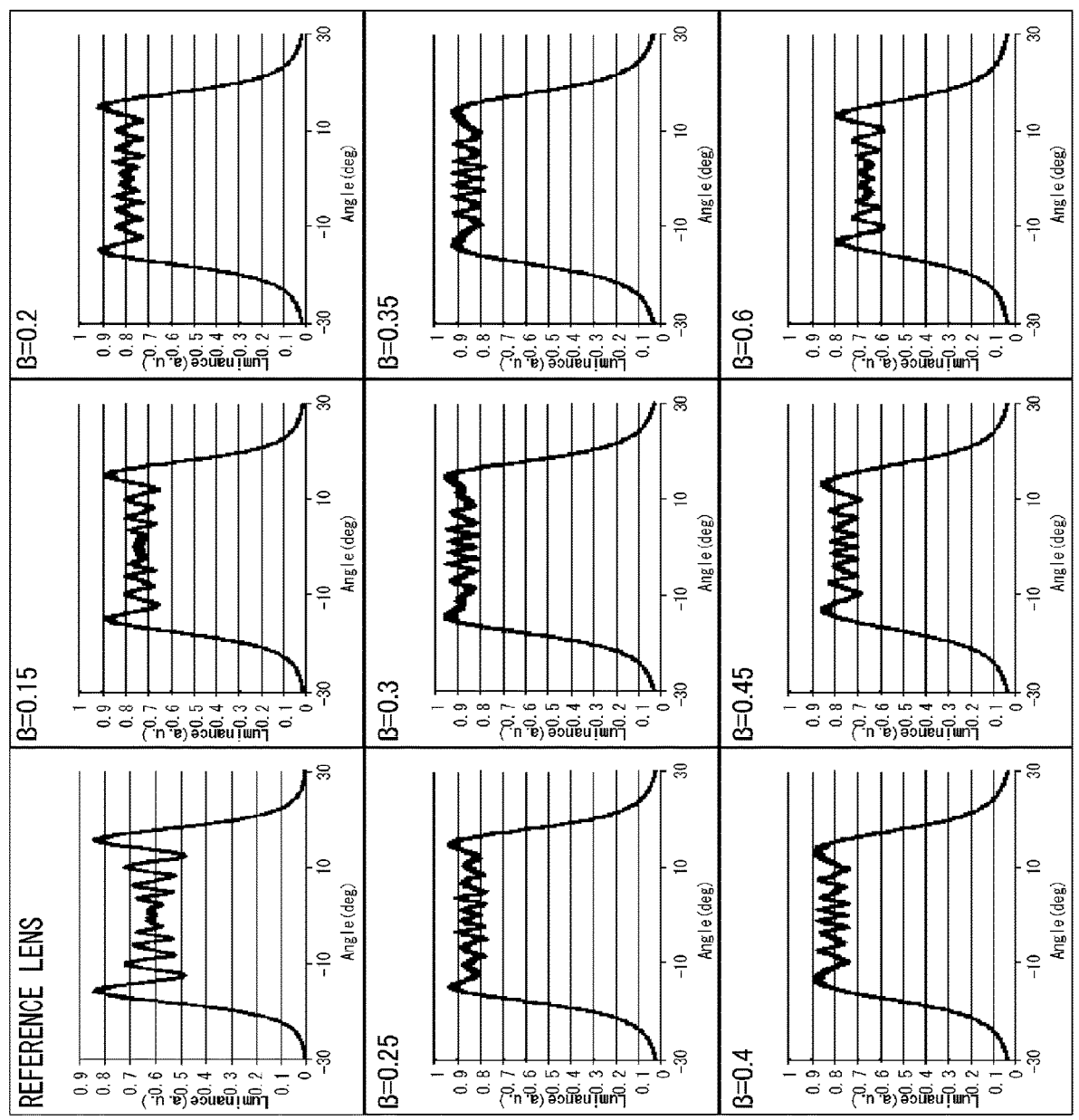
FIG. 15 shows luminance distributions in a lateral direction.

FIG. 15 shows graphs of the luminance at the section Sx in the longitudinal direction shown in FIGS. 2 and 3. In the graphs, the luminance is shown along the vertical axis, and the angle of refracted light is shown along the horizontal axis.

The graph in the upper left of FIG. 15 is a graph of a reference lens. This reference lens is identical to the reference lens described with reference to FIG. 12. The radius of curvature r, the conic constant k, and the wavelength $\lambda$ are as described with reference to FIG. 12.

In FIG. 15, the eight other graphs are graphs of corrected lenses. Referring back to FIG. 9, correction at a skirt will be described. In the following range corresponding to a skirt of a corrected lens, $$|x| \ge \frac{L}{2} - \Delta x \qquad \text{[Math. 33]}$$

the sag amount z is expressed as a conic curve corrected as indicated by the following equation.

$$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^4 \Delta z \right) \qquad \text{[Math. 34]}$$

Herein, $\Delta x$ and $\Delta z$ are expressed as follows.

$$\Delta x = 0.52 \sqrt{\frac{0.75 \lambda r}{n-1}} \qquad \text{[Math. 35]}$$

-continued $$\Delta z = \frac{\beta \lambda}{n-1} \qquad \text{[Math. 36]}$$

The diameter L of the lens is equal to the pitch Px shown in FIG. 2, and the value of the diameter L of the lens is 30 μm. The order of correction $\gamma$ described above is fixed at 4. The correction width factor $\alpha$ described above is fixed at 1. The absolute refractive index n is 1.5. The correction coefficient $\beta$ is from 0.15 to 0.6. The sag amount z at a portion that is not corrected is expressed as a conic curve that is identical to the conic curve of the reference lens. In FIG. 15, the ripples decrease as the correction coefficient $\beta$ increases. However, the ripples start to increase again at around the correction coefficient (3=0.3.

Figure 16:
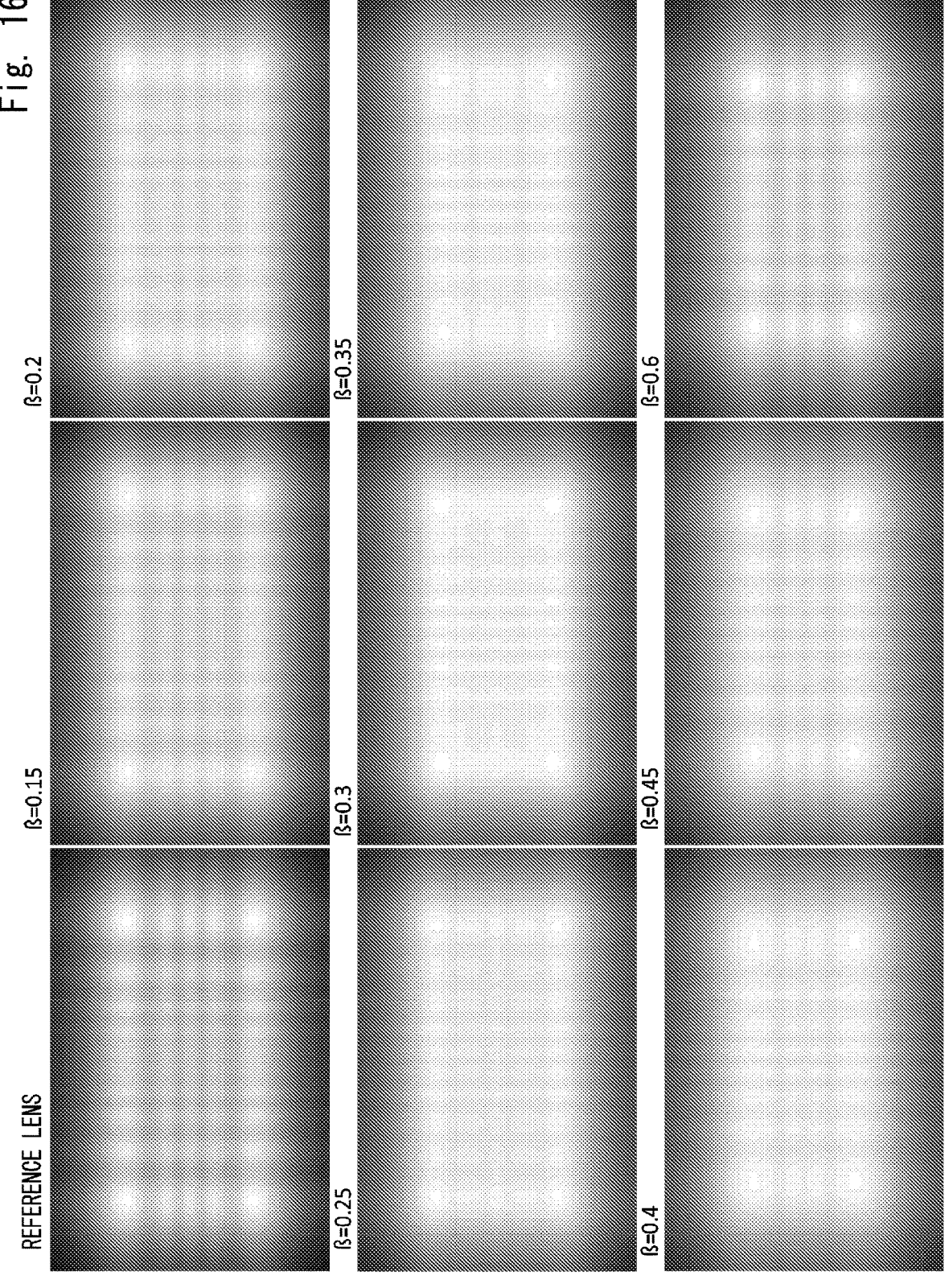
FIG. 16 shows simulations of observation images.

FIG. 16 shows simulations of observation images, as the microlens array is viewed in plan view. This shows that the unevenness in the luminance is reduced at around $\beta$=0.3 in both the longitudinal direction and the lateral direction of different divergence angles.

Example 1-3

In order to example the order of correction $\gamma$ described above, a lens was designed in a manner similar to that of <Example 1-1>.

Figure 17:
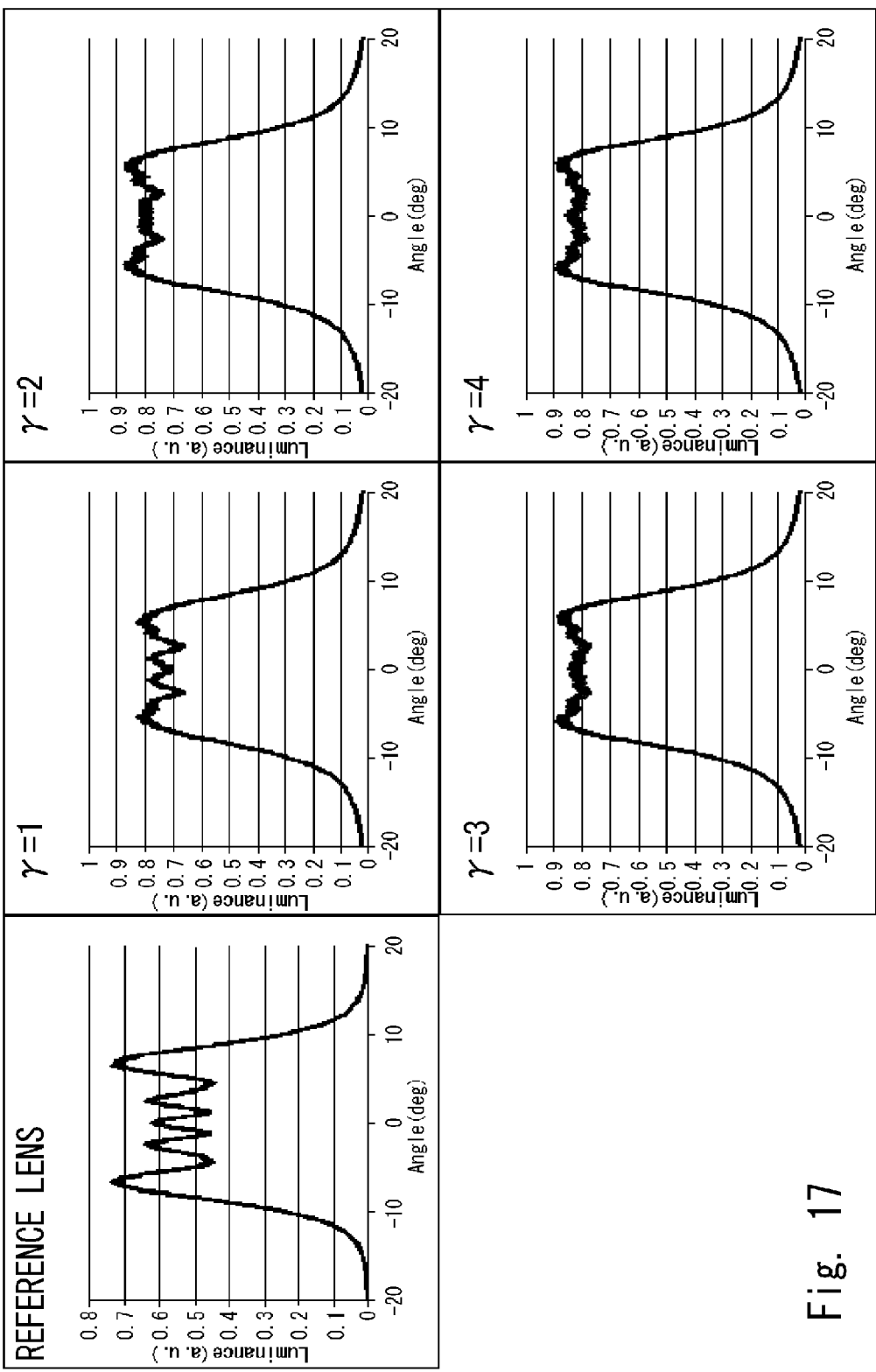
FIG. 17 shows luminance distributions in a longitudinal direction.

FIG. 17 shows graphs of the luminance at the section Sy in the longitudinal direction shown in FIGS. 2 and 3. In the graphs, the luminance is shown along the vertical axis, and the angle of refracted light is shown along the horizontal axis.

The graph in the upper left of FIG. 17 is a graph of a reference lens. This reference lens is identical to the reference lens described with reference to FIG. 11. The radius of curvature r, the conic constant k, and the wavelength $\lambda$ are as described with reference to FIG. 11.

In FIG. 17, the four other graphs are graphs of corrected lenses. Referring back to FIG. 9, correction at a skirt will be described. In this discussion, the x-axis in FIG. 9 is replaced by the y-axis. In the following range corresponding to a skirt of a corrected lens, $$|y| \ge \frac{L}{2} - \Delta y \qquad \text{[Math. 37]}$$

the sag amount z is expressed as a conic curve corrected as indicated by the following equation.

$$z = \left( \frac{(1/r) \cdot y^2}{1 + \sqrt{1 - (1+k) \cdot (1/r)^2 \cdot y^2}} + \left( \frac{y + \Delta y - L/2}{\Delta y} \right)^\gamma \Delta z \right) \qquad \text{[Math. 38]}$$

Herein, $\Delta y$ and $\Delta z$ are expressed as follows.

$$\Delta y = 0.1(\gamma + 1.2) \sqrt{\frac{0.75 \lambda r}{n-1}} \qquad \text{[Math. 39]}$$

$$\Delta z = \frac{0.3 \lambda}{n-1} \qquad \text{[Math. 40]}$$

The diameter L of the lens is equal to the pitch Py shown in FIG. 2, and the value of the diameter L of the lens is 30 μm. The order of correction $\gamma$ is from 1 to 4. The correction width factor $\alpha$ described above is fixed at 1. The absolute refractive index n is 1.5. The correction coefficient $\beta$ described above is fixed at 0.3. The sag amount z at a portion that is not corrected is expressed as a conic curve that is identical to the conic curve of the reference lens.

In FIG. 17, the ripples decrease as the order of correction $\gamma$ increases.

Figure 18:
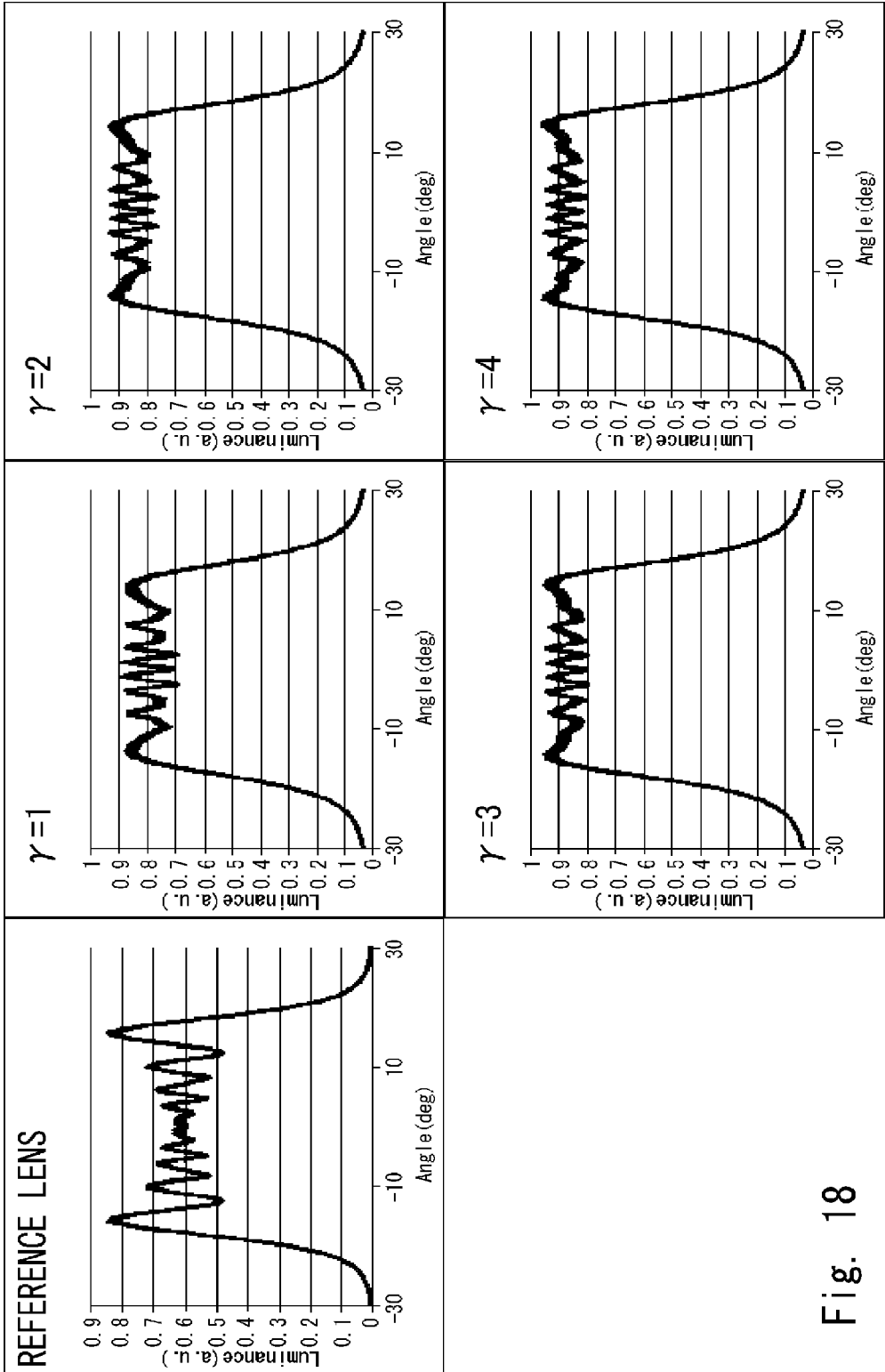
FIG. 18 shows luminance distributions in a lateral direction.

FIG. 18 shows graphs of the luminance at the section Sx in the longitudinal direction shown in FIGS. 2 and 3. In the graphs, the luminance is shown along the vertical axis, and the angle of refracted light is shown along the horizontal axis.

The graph in the upper left of FIG. 18 is a graph of a reference lens. This reference lens is identical to the reference lens described with reference to FIG. 12. The radius of curvature r, the conic constant k, and the wavelength $\lambda$ are as described with reference to FIG. 12.

In FIG. 18, the four other graphs are graphs of corrected lenses. Referring back to FIG. 9, correction at a skirt will be described. In the following range corresponding to a skirt of a corrected lens, $$|x| \geq \frac{L}{2} - \Delta x \qquad \text{[Math. 41]}$$

the sag amount z is expressed as a conic curve corrected as indicated by the following equation.

$$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^{\gamma} \Delta z \right) \qquad \text{[Math. 42]}$$

Herein, $\Delta x$ and $\Delta z$ are expressed as follows.

$$\Delta x = 0.1(\gamma + 1.2)\sqrt{\frac{0.75\lambda r}{n - 1}} \qquad \text{[Math. 43]}$$

$$\Delta z = \frac{0.3\lambda}{n - 1} \qquad \text{[Math. 44]}$$

The diameter L of the lens is equal to the pitch Px shown in FIG. 2, and the value of the diameter L of the lens is 30 $\mu$m. The order of correction $\gamma$ is from 1 to 4. The correction width factor $\alpha$ described above is fixed at 1. The absolute refractive index n is 1.5. The correction coefficient $\beta$ described above is fixed at 0.3. The sag amount z at a portion that is not corrected is expressed as a conic curve that is identical to the conic curve of the reference lens.

In FIG. 18, the ripples decrease as the order of correction $\gamma$ increases.

Figure 19:
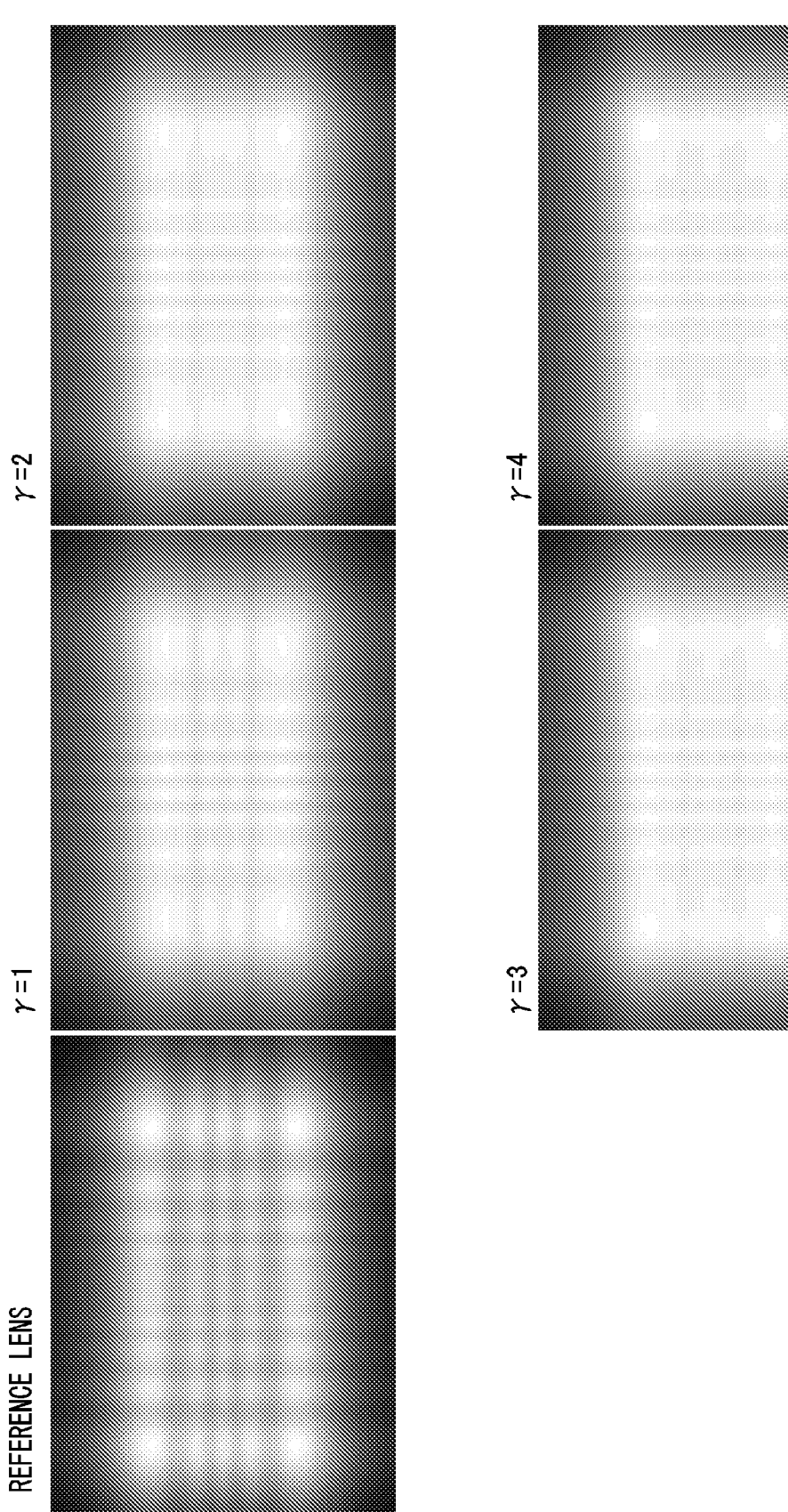
FIG. 19 shows simulations of observation images.

FIG. 19 shows simulations of observation images, as the microlens array is viewed in plan view. This shows that the unevenness in the luminance is reduced as the order of correction $\gamma$ approaches 4 in both the longitudinal direction and the lateral direction of different divergence angles.

Example 1-4

In order to examine the diameter L of the lens described above, that is, the pitch of the lens, a lens was designed in a manner similar to that of <Example 1-1>.

Figure 20:
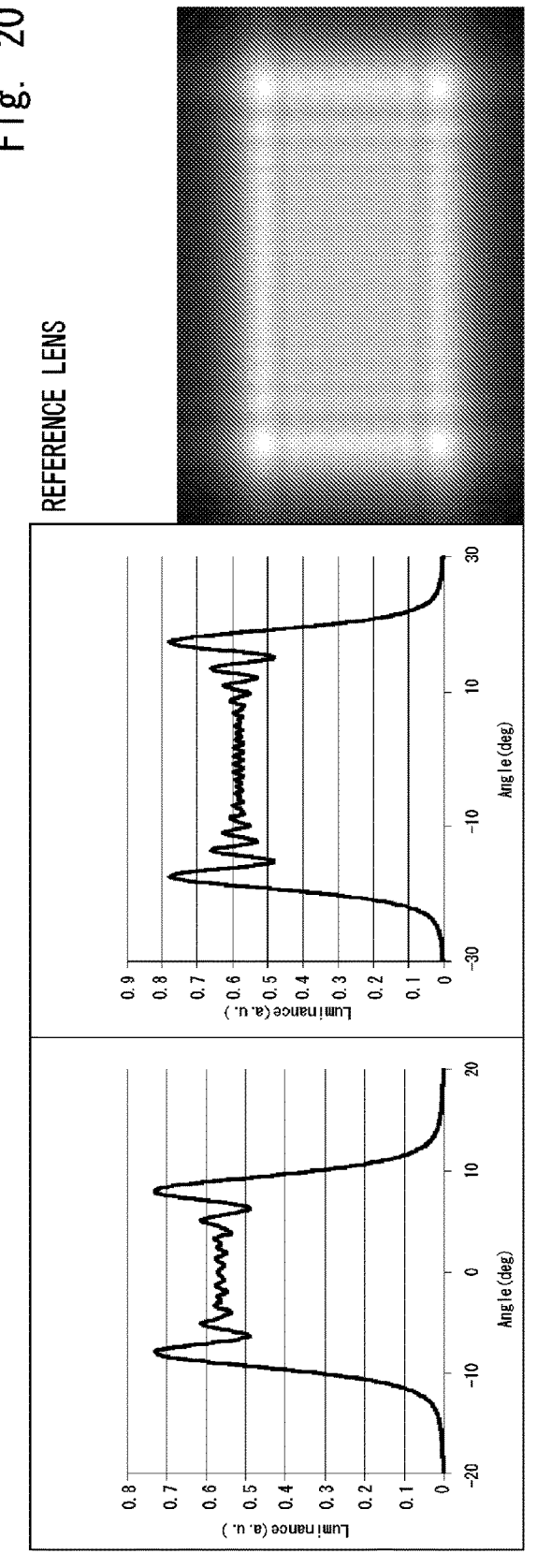
FIG. 20 shows luminance distributions and observation images.
Figure 20:
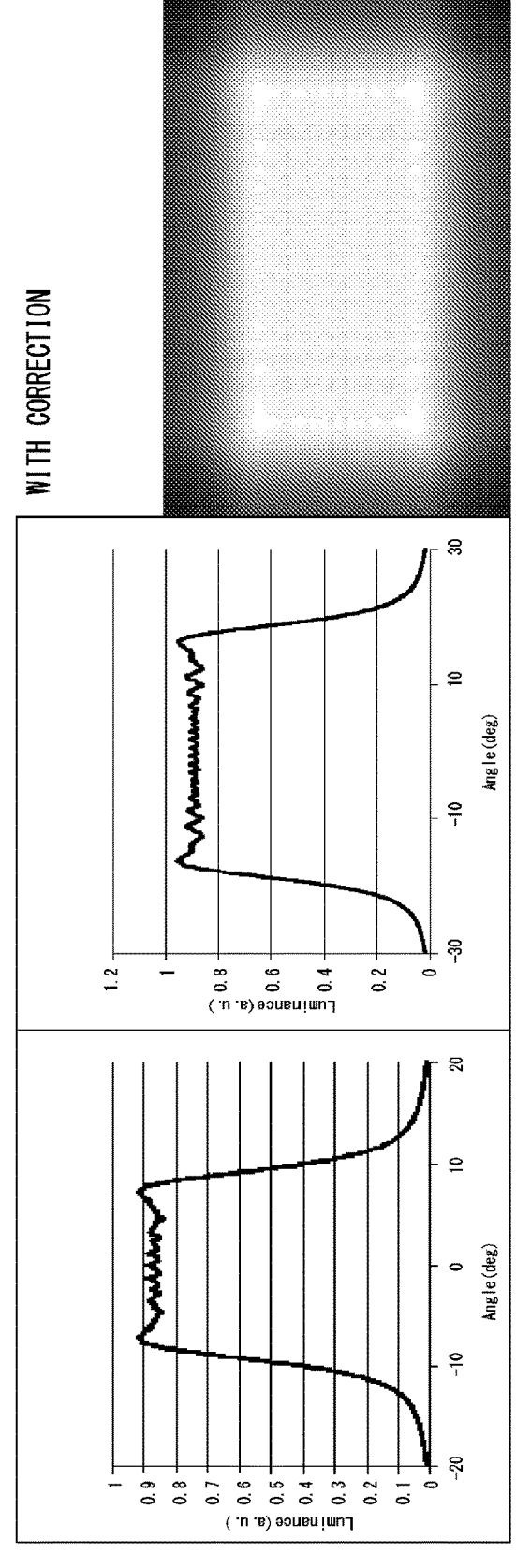

FIG. 20 shows graphs of the luminance at the section Sy in the longitudinal direction and the section Sx in the lateral direction shown in FIGS. 2 and 3. In the graphs, the luminance is shown along the vertical axis, and the angle of refracted light is shown along the horizontal axis. FIG. 20 further shows simulations of observation images, as the microlens array is viewed in plan view. The graphs in the upper half are both graphs of a reference lens. The graphs in the lower half are both graphs of a corrected lens. The graphs on the left side are graphs of the section Sy in the longitudinal direction. The graphs on the right side are graphs of the section Sx in the lateral direction.

Referring back to FIG. 9, correction at a skirt in the longitudinal direction will be described. In this discussion, the x-axis in FIG. 9 is replaced by the y-axis. In the following range corresponding to a skirt of a corrected lens, $$|y| \geq \frac{L}{2} - \Delta y \qquad \text{[Math. 45]}$$

the sag amount z is expressed as a conic curve corrected as indicated by the following equation.

$$z = \left( \frac{(1/r) \cdot y^2}{1 + \sqrt{1 - (1+k) \cdot (1/r)^2 \cdot y^2}} + \left( \frac{y + \Delta y - L/2}{\Delta y} \right)^4 \Delta z \right) \qquad \text{[Math. 46]}$$

Herein, $\Delta y$ and $\Delta z$ are expressed as follows.

$$\Delta y = 0.52\sqrt{\frac{0.75\lambda r}{n - 1}} \qquad \text{[Math. 47]}$$

$$\Delta z = \frac{0.3\lambda}{n - 1} \qquad \text{[Math. 48]}$$

The diameter L of the lens in the longitudinal direction is equal to the pitch Py shown in FIG. 2, and the value of the diameter L of the lens in the longitudinal direction is 60 $\mu$m. The radius of curvature r is 80 $\mu$m. The conic constant k is $-1.0$. The wavelength $\lambda$ is 630 nm. The order of correction $\gamma$ described above is fixed at 4. The correction width factor $\alpha$ described above is fixed at 1. The absolute refractive index n is 1.5. The correction coefficient $\beta$ described above is fixed at 0.3. The sag amount z at a portion that is not corrected is expressed as a conic curve that is identical to the conic curve of the reference lens.

Referring back to FIG. 9, correction at a skirt in the lateral direction will be described. In the following range corresponding to a skirt of a corrected lens, $$|x| \geq \frac{L}{2} - \Delta x \qquad \text{[Math. 49]}$$

the sag amount z is expressed as a conic curve corrected as indicated by the following equation.

$$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^4 \Delta z \right) \qquad \text{[Math. 50]}$$

Herein, $\Delta x$ and $\Delta z$ are expressed as follows.

$$\Delta x = 0.52\sqrt{\frac{0.75\lambda r}{n-1}} \qquad \text{[Math. 51]}$$

$$\Delta z = \frac{0.3\lambda}{n-1} \qquad \text{[Math. 52]}$$

The diameter L of the lens in the lateral direction is equal to the pitch Px shown in FIG. 2, and the value of the diameter L of the lens in the lateral direction is 60 μm. The radius of curvature r is 40 μm. The conic constant k is −1.0. The wavelength $\lambda$ is the same as the wavelength $\lambda$ in the longitudinal direction. The order of correction $\gamma$ described above is fixed at 4. The correction width factor $\alpha$ described above is fixed at 1. The absolute refractive index n is the same as the absolute refractive index n in the longitudinal direction. The correction coefficient $\beta$ described above is fixed at 0.3. The sag amount z at a portion that is not corrected is expressed as a conic curve that is identical to the conic curve of the reference lens.

As seen from the observation images shown in FIG. 20, the ripples are reduced through the correction of the skirt even when the pitches of the lens in the longitudinal and the lateral directions are both 60 μm.

Example 1-5

Figure 21:
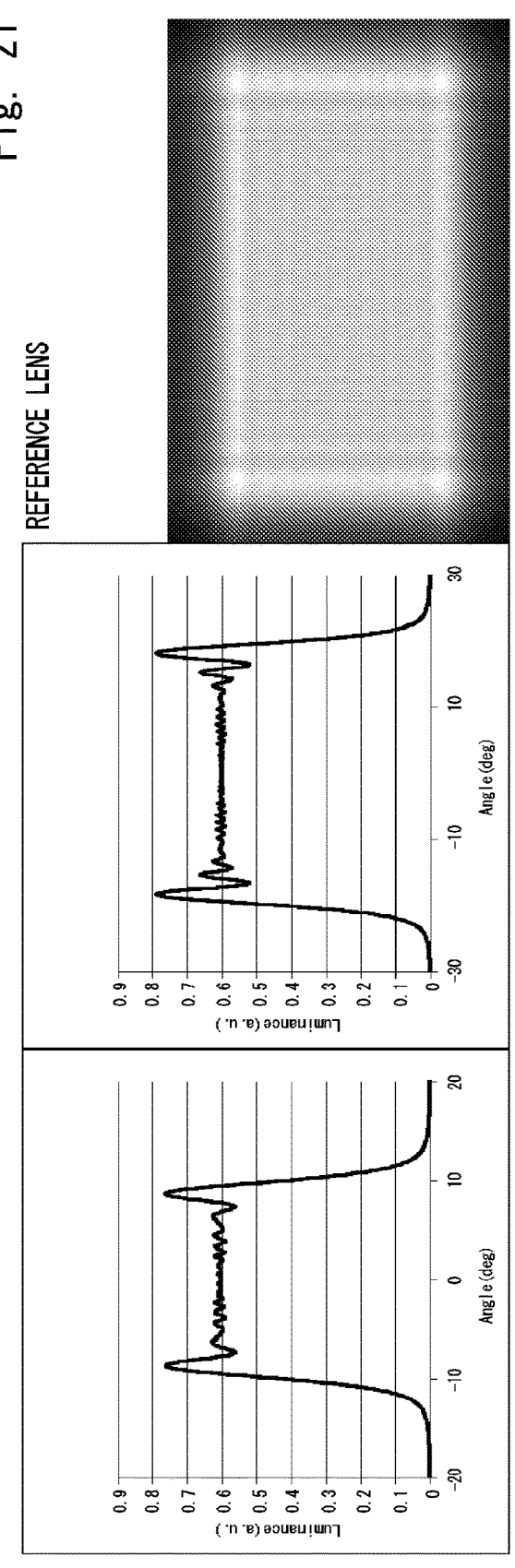
FIG. 21 shows luminance distributions and observation images.
Figure 21:
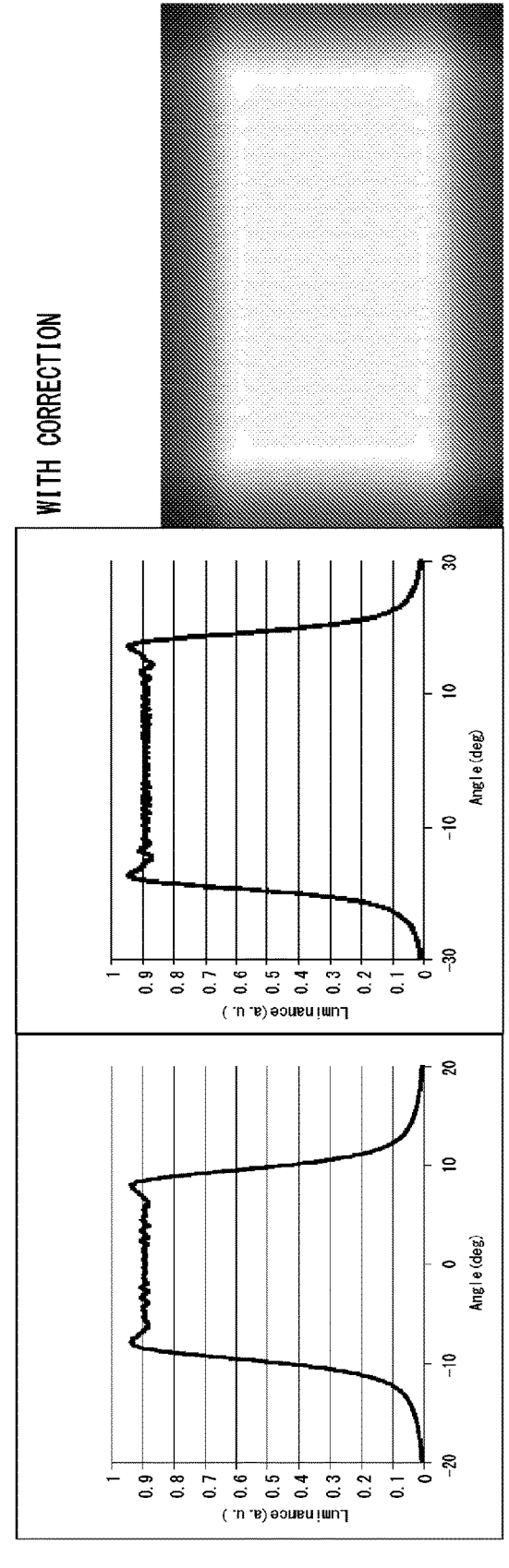

In order to examine the diameter L of the lens described above, that is, the pitch of the lens, a lens was designed in a manner similar to that of <Example 1-4>. The graphs and the observation images shown in FIG. 21 are to be interpreted in a manner similar to that for FIG. 20. Correction of a skirt in the longitudinal direction and the lateral direction follows the correction in <Example 1-4>.

The diameter L of the lens in the longitudinal direction is equal to the pitch Py shown in FIG. 2, and the value of the diameter L of the lens in the longitudinal direction is 100 μm. The radius of curvature r is 133.3 μm. The conic constant k is −1.0. The wavelength $\lambda$ is 630 nm. The order of correction $\gamma$ described above is fixed at 4. The correction width factor $\alpha$ described above is fixed at 1. The absolute refractive index n is 1.5. The correction coefficient $\beta$ described above is fixed at 0.3. The sag amount z at a portion that is not corrected is expressed as a conic curve that is identical to the conic curve of the reference lens.

The diameter L of the lens in the lateral direction is equal to the pitch Px shown in FIG. 2, and the value of the diameter L of the lens in the lateral direction is 100 μm. The radius of curvature r is 66.7 μm. The conic constant k is −1.0. The wavelength $\lambda$ is the same as the wavelength $\lambda$ in the longitudinal direction. The order of correction $\gamma$ described above is fixed at 4. The correction width factor $\alpha$ described above is fixed at 1. The absolute refractive index n is the same as the absolute refractive index n in the longitudinal direction. The correction coefficient $\beta$ described above is fixed at 0.3. The sag amount z at a portion that is not corrected is expressed as a conic curve that is identical to the conic curve of the reference lens.

As seen from the observation images shown in FIG. 21, the ripples are reduced through the correction of the skirt even when the pitches of the lens in the longitudinal and the lateral directions are both 100 μm.

Example 1-6

Figure 22:
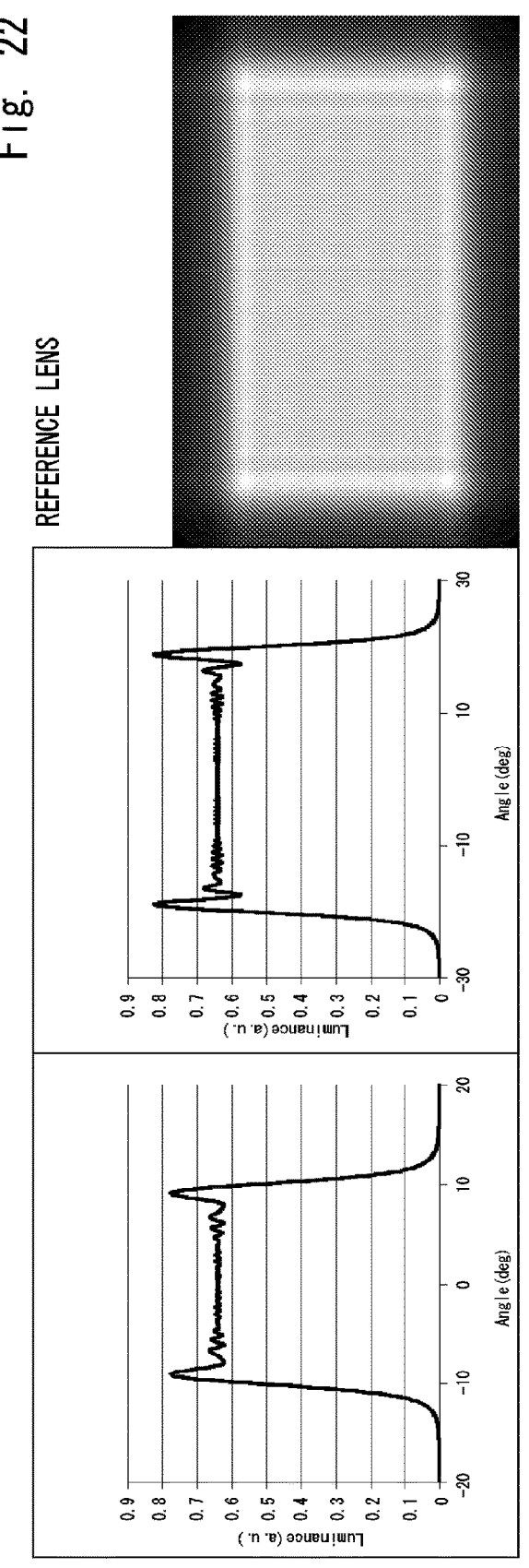
FIG. 22 shows luminance distributions and observation images.
Figure 22:
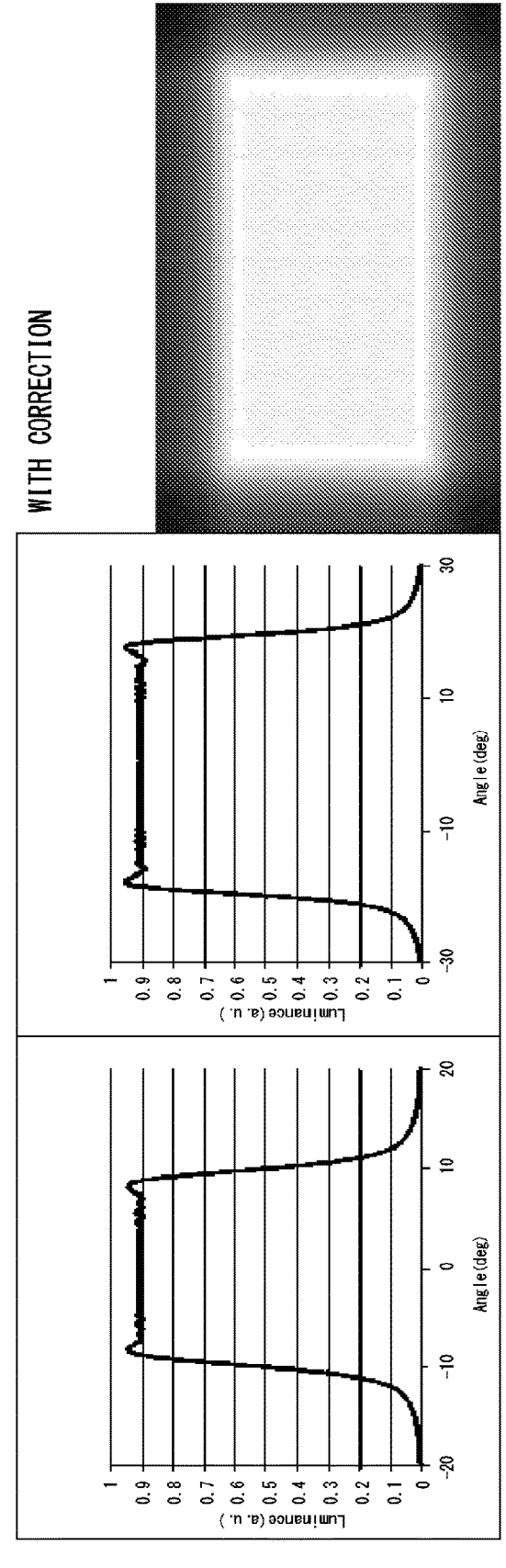

In order to examine the diameter L of the lens described above, that is, the pitch of the lens, a lens was designed in a manner similar to that of <Example 1-4>. The graphs and the observation images shown in FIG. 22 are to be interpreted in a manner similar to that for FIG. 20. Correction of a skirt in the longitudinal direction and the lateral direction follows the correction in <Example 1-4>.

The diameter L of the lens in the longitudinal direction is equal to the pitch Py shown in FIG. 2, and the value of the diameter L of the lens in the longitudinal direction is 150 μm. The radius of curvature r is 200 μm. The conic constant k is −1.0. The wavelength $\lambda$ is 630 nm. The order of correction $\gamma$ described above is fixed at 4. The correction width factor $\alpha$ described above is fixed at 1. The absolute refractive index n is 1.5. The correction coefficient $\beta$ described above is fixed at 0.3. The sag amount z at a portion that is not corrected is expressed as a conic curve that is identical to the conic curve of the reference lens.

The diameter L of the lens in the lateral direction is equal to the pitch Px shown in FIG. 2, and the value of the diameter L of the lens in the lateral direction is 150 μm. The radius of curvature r is 100 μm. The conic constant k is −1.0. The wavelength $\lambda$ is the same as the wavelength $\lambda$ in the longitudinal direction. The order of correction $\gamma$ described above is fixed at 4. The correction width factor $\alpha$ described above is fixed at 1. The absolute refractive index n is the same as the absolute refractive index n in the longitudinal direction. The correction coefficient $\beta$ described above is fixed at 0.3. The sag amount z at a portion that is not corrected is expressed as a conic curve that is identical to the conic curve of the reference lens.

As seen from the observation images shown in FIG. 22, the ripples are reduced through the correction of the skirt even when the pitches of the lens in the longitudinal and the lateral directions are both 150 μm.

Modified Example 1: Microlens Array of Concave Lenses

The microlens array described above is a microlens array of convex lenses. A micro array of concave lenses may be designed as described below.

FIG. 23 shows a section Sx of a concave lens constituting a micro array and a luminance distribution. The coordinate axis x represents the horizontal coordinate with its center on the axis of symmetry of the meridian of the section Sx. Light is assumed to become incident from the +z-direction in the drawing. A meridian Mo of the section Sx held before correction is a conic curve. A conic curve according to the present embodiment includes an ellipse, a parabola, and a hyperbola. An ellipse includes a circle. A conic curve does not include two straight lines. The term "conic curve" is construed in a similar manner, hereinafter. A lens having a meridian Mo and having not been corrected may be referred to as a reference lens.

FIG. 23 further shows a meridian Mc of the section Sx held after correction. A lens having a meridian Mc and having been corrected may be referred to as a corrected lens. In one aspect, the center portion of the meridian Mc is represented by a conic curve. A rim of the meridian Mc is represented by a corrected conic curve. Herein, a rim refers to the vicinity of an edge of a concave lens shape. The sag amount of the rim is corrected. The rim rises slightly in the +z-direction.

The size of the range in the horizontal direction is denoted by $\Delta x$. The correction amount of the sag amount is denoted by $\Delta z$. In the following range of the x-coordinate in the horizontal direction, the sag amount z is expressed as a conic curve that is not corrected, as indicated by the following equation, in which L is the width of the lens. In one aspect, the width L of the lens is equal to the pitch of the lens. Herein, k is the conic constant, and r is the radius of curvature of the conic curve.

$$|x| < \frac{L}{2} - \Delta x \qquad \text{[Math. 53]}$$

$$z = \frac{(1/r) \cdot x^2}{1 + \sqrt{1 - (1 + k) \cdot (1/r)^2 \cdot x^2}} \qquad \text{[Math. 54]}$$

Meanwhile, it is preferable that the correction performed at the rim be performed in the following range of the x-coordinate in the horizontal direction with its center on the axis of symmetry of the meridian.

$$|x| \geq \frac{L}{2} - \Delta x \qquad \text{[Math. 55]}$$

The size $\Delta x$ of the range in the horizontal direction in which the sag amount is corrected is expressed as follows.

$$\Delta x = 0.1(\gamma + 1.2)\sqrt{\frac{0.75\lambda r}{n - 1}} \qquad \text{[Math. 56]}$$

In the above, $\gamma$ is a real number representing the order of correction. Preferably, $1 \leq \gamma \leq 10$ holds; preferably, $2 < \gamma$ holds; or preferably, $3 < \gamma$ holds. The skirt becomes a straight line when $\gamma = 1$.

In the above, $\lambda$ is the wavelength of the light rays.

In the above, r is the radius of curvature of the conic curve.

In the above, n is the absolute refractive index of the lens, and n is approximated by the relative refractive index of the lens with respect to the air.

The correction amount $\Delta z$ of the sag amount is expressed as follows.

$$\Delta z = \frac{0.3\lambda}{n - 1} \qquad \text{[Math. 57]}$$

The sag amount z is expressed as a conic curve corrected as indicated by the following equation.

$$z = \left( \frac{(1/r) \cdot x^2}{1 + \sqrt{1 - (1 + k) \cdot (1/r)^2 \cdot x^2}} + \left( \frac{x + \Delta x - L/2}{\Delta x} \right)^\gamma \Delta z \right) \qquad \text{[Math. 58]}$$

In FIG. 23, the light beam 35 becomes incident on the lens. The beam 35 refracted at the concave lens surface diverges. The angle $\theta$ of the refracted light rays is determined by the x-coordinate of the meridian. In the drawing, the angle $\theta$ is the angle of spread of the refracted light rays relative to the axis of symmetry of the meridian of the section Sx. In the drawing, the angle $\theta$ is indicated in positive and negative values, for the sake of convenience. The half width at half maximum of the radiance distribution of the refracted beam 35 is the divergence angle $\theta c$ of the reference lens. In the drawing, the divergence angle $\theta c$ held after correction is 10 degrees. The divergence angle $\theta c$ is equal to the divergence angle held before correction. The taper of the diverging beam 35 is $2\theta c$, which is 20 degrees. This taper is equal to the taper held before correction.

As shown in FIG. 23, shoulders of the luminance curve Lo before correction lie near the points where the angle $\theta$ is ±10 degrees. Ripples of the luminance curve that can cause luminance unevenness are observed around these shoulders. In a similar manner, shoulders of the luminance curve Lc after correction lie near the points where the angle $\theta$ is ±10 degrees. Ripples of the luminance curve that can cause luminance unevenness are observed around these shoulders. However, the vibrations, that is, the ripples of the luminance are alleviated in the luminance curve Lc, as compared to those in the luminance curve Lo.

Modified Example 2: Reflective Diffusion Plate of Concave Mirror Array Type

The microlens array described above is a transmissive microlens array suitable for a transmissive screen. A reflective diffusion plate of a concave mirror array type suitable for a reflective screen is designed and fabricated as described below.

Figure 24:
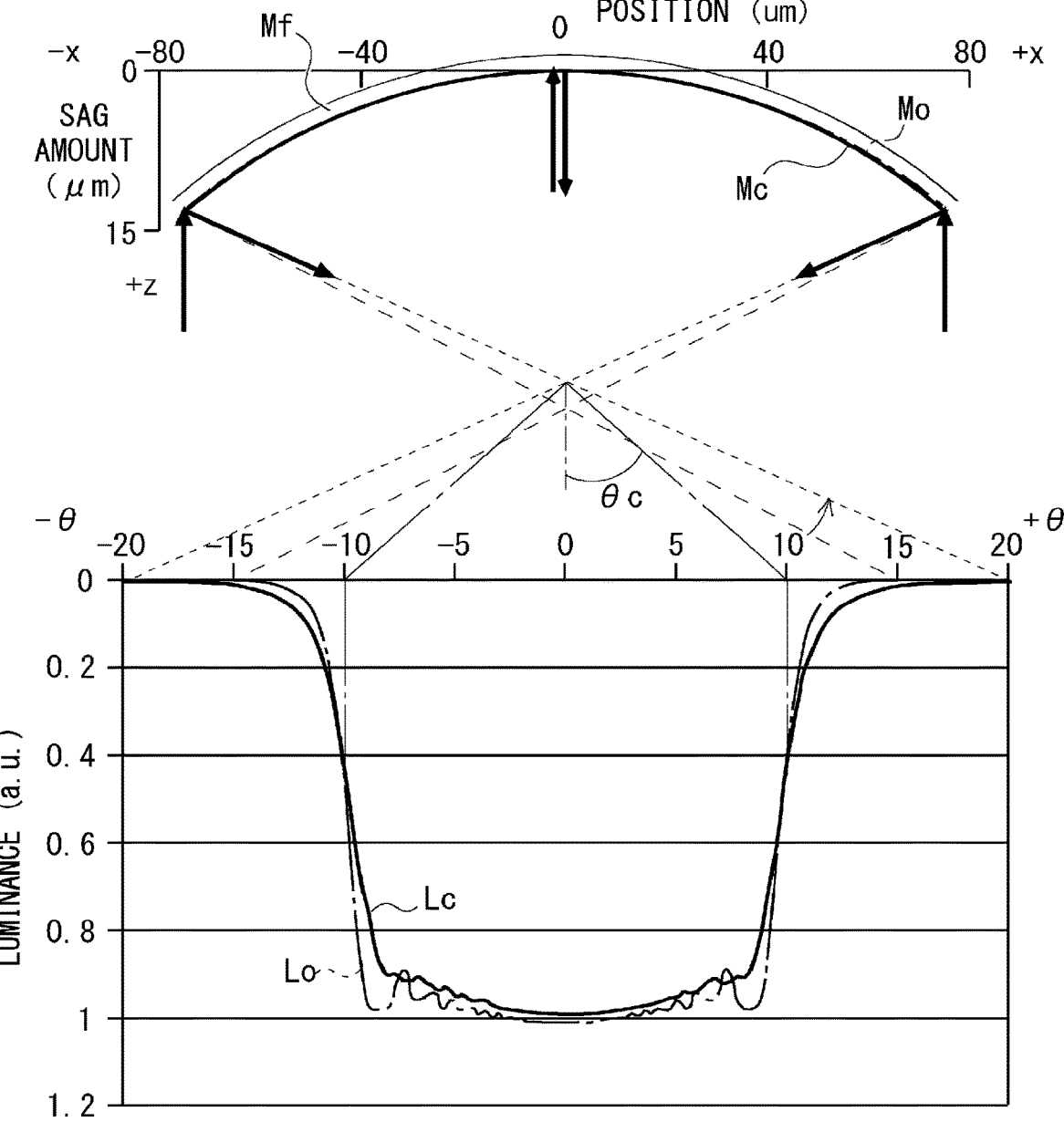
FIG. 24 shows a section of a concave mirror and a luminance distribution.

FIG. 24 shows a section of a metal film Mf constituting a reflection concave micromirror array. A concave mirror array is created with the shape of the microlens array described above used as a mold and by depositing a metal film Mf on each convex surface of the mold. The shape of the concave surface of the metal film Mf is a transfer of the shape of the convex surface of the convex lens shape shown in FIG. 2. In one aspect, the metal film Mf is made of aluminum.

In the reflective concave micromirror array, concave mirrors are arrayed longitudinally and laterally on an array surface. The shape of the reflective concave micromirror array is a transfer of the shape of the microlens array shown in FIG. 1. Therefore, when the longitudinal direction and the lateral direction of the concave mirrors are regarded as the longitudinal direction and the lateral direction of a single concave mirror, the concave mirror has a cross-cylindrical concave surface composed of a combination of a concave surface that is cylindrical along the lateral direction throughout the sections parallel to the longitudinal direction of the concave mirror and are orthogonal to the array surface and a concave surface that is cylindrical along the longitudinal direction throughout the sections parallel to the lateral direction of the concave mirror and are orthogonal to the array surface.

In FIG. 24, the concave surface of the metal film Mf has a meridian identical to the meridian Mc. The meridian Mc after correction is as described with reference to FIGS. 3 and 4. The same applies to the meridian Mo before correction as well.

In FIG. 24, a light beam having traveled through the air or through the vacuum becomes incident on the concave mirror array from the +z-direction. The beam reflected by the concave surface diverges. The angle $\theta$ of the reflected light rays is determined by the x-coordinate of the meridian. In the drawing, the angle $\theta$ is the angle of spread of the reflected light rays relative to the axis of symmetry of the meridian of the section. In the drawing, the angle $\theta$ is indicated in positive and negative values, for the sake of convenience. The half width at half maximum of the radiance distribution of the reflected beam is the divergence angle $\theta c$ of the reference lens. In the drawing, the divergence angle $\theta c$ held after correction is 10 degrees. The divergence angle $\theta c$ is equal to the divergence angle held before correction. The taper of the diverging beam 35 is 2θc, which is 20 degrees. This taper is equal to the taper held before correction.

FIG. 25 shows an enlarged view of a rim of a meridian. Herein, a rim refers to the vicinity of an edge of a concave mirror shape. For comparison, a skirt of a convex lens used in a transmissive diffusion plate is shown in the left side. A rim of a concave mirror is shown in the right side. In either drawing, the rim of the meridian Mc rises slightly in the +z-direction, as compared to the rim of the meridian Mo. In this manner, the correction amount Δz is added to the sag amount so as to increase the inclination of the rim in the meridian of the section.

Referring back to FIG. 24, shoulders of the luminance curve Lo before correction lie near the points where the angle θ is ±10 degrees. Ripples of the luminance curve that can cause luminance unevenness are observed around these shoulders. In a similar manner, shoulders of the luminance curve Lc after correction lie near the points where the angle θ is ±10 degrees. Ripples of the luminance curve that can cause luminance unevenness are observed around these shoulders. However, the variations, that is, the ripples of the luminance are alleviated in the luminance curve Lc, as compared to those in the luminance curve Lo.

In one aspect shown in FIG. 24, a method of correction is as follows. First, the center of the concave mirror that is not corrected will be described. In the following range of the x-coordinate in the horizontal direction, the sag amount z is expressed as a conic curve that is not corrected, as indicated by the equation above described in the section <Reference Lens>. Meanwhile, the correction performed at the rim is performed in the following range of the x-coordinate in the horizontal direction with its center on the axis of symmetry of the meridian.

$$|x| \geq \frac{L}{2} - \Delta x \qquad \text{[Math. 59]}$$

The sag amount z is expressed as a conic curve corrected as indicated by the following equation.

$$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^\gamma \Delta z \right) \qquad \text{[Math. 60]}$$

As shown in FIG. 25, with the transmissive diffusion plate described above, the fact that the difference in the optical path length before and after correction is (n−1)-fold is taken into consideration when Δx is obtained. For details, see the section <Method of Correction> above.

In contrast, in the reflective diffusion plate according to the present modified example, the difference in the optical path length before and after correction is two-fold since the light reciprocates in the segment of Δz, as shown in the right side of FIG. 25.

Therefore, Δx is expressed as follows.

$$\Delta x = a \times 0.1(\gamma + 1.2) \sqrt{\frac{0.75\lambda r}{2n}} \qquad \text{[Math. 61]}$$

The coefficient under the root is reduced, and Δx is expressed as follows.

$$\Delta x = 0.1\alpha(\gamma + 1.2)\sqrt{0.375\lambda r} \qquad \text{[Math. 62]}$$

Furthermore, Δz is expressed as follows.

$$\Delta z = \beta \lambda / 2 \qquad \text{[Math. 63]}$$

L is the width of the meridian, and α is a real number no smaller than 0.5 nor greater than 2. In one aspect, a is 1. Meanwhile, β is a real number no smaller than 0.15 nor greater than 0.6. In one aspect, β is 0.3. Meanwhile, γ is a real number no smaller than 1 nor greater than 10, r is the radius of curvature of the conic curve, and λ is the wavelength of the visible light rays. In one preferred aspect, α is a real number no smaller than 0.9 nor greater than 1.1, β is a real number no smaller than 0.25 nor greater than 0.35, and γ is a real number no smaller than 2 nor greater than 10.

Figure 26:
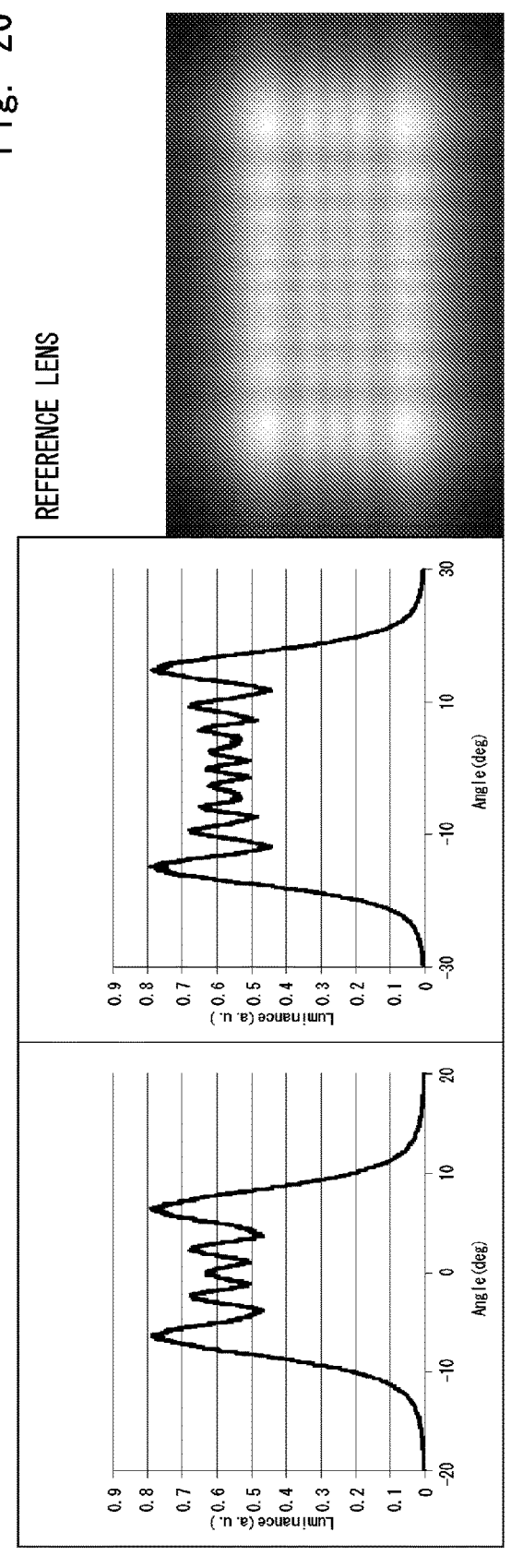
FIG. 26 shows luminance distributions and observation images.
Figure 26:
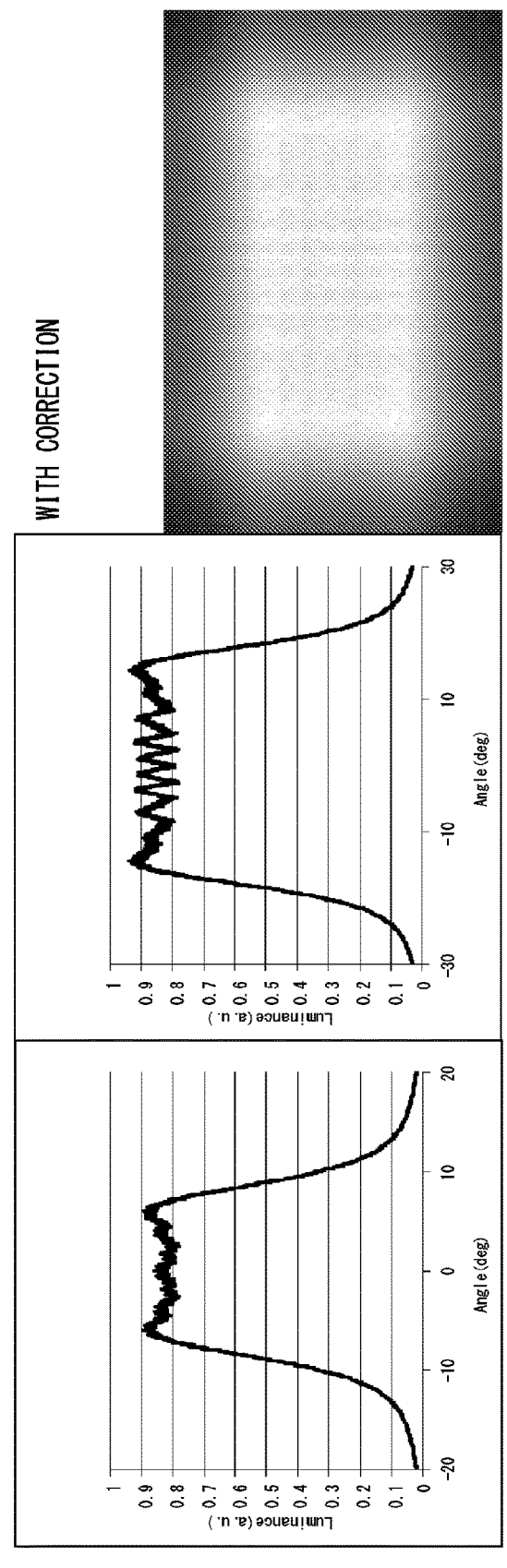

FIG. 26 shows graphs of the luminance at a section in the lateral direction (x-direction) shown in FIG. 24 and a section in the longitudinal direction (y-direction) orthogonal to that section. In the graphs, the luminance is shown along the vertical axis, and the angle of refracted light is shown along the horizontal axis. The graphs on the left side are graphs of the section in the longitudinal direction. The graphs on the right side are graphs of the section in the lateral direction. FIG. 26 further shows, in the right side, simulations of observation images, as the microlens array on the right side is viewed in plan view. Those shown in the upper half are for a concave surface serving as a reference. Those shown in the lower half are for a concave surface whose sag amount has been corrected. As seen from these simulations, the ripples are reduced through the correction of the rim in the concave mirror as well.

Modified Example 3: Reflective Diffusion Plate of Convex Mirror Array Type

Another aspect of a diffusion plate of a micro array type is a convex micromirror array in which convex mirrors are arrayed longitudinally and lateral on an array surface. In one aspect of a convex micromirror array, when the longitudinal direction and the lateral direction of the convex mirrors are regarded as the longitudinal direction and the lateral direction of a single convex mirror, the convex mirror has a cross-cylindrical convex surface composed of a combination of a convex surface that is cylindrical along the lateral direction throughout the sections parallel to the longitudinal direction of the convex mirror and are orthogonal to the array surface and a convex surface that is cylindrical along the longitudinal direction throughout the sections parallel to the lateral direction of the convex mirror and are orthogonal to the array surface. Furthermore, the sag amount is corrected so as to increase the inclination of the skirt in each of the meridians of the sections parallel to the longitudinal direction and of the sections parallel to the lateral direction. In one preferred aspect, the meridians of the sections parallel to the longitudinal direction and of the sections parallel to the lateral direction are each composed of a conic curve whose sag amount is corrected.

The method of correction is as follows. First, the center of the convex mirror that is not corrected will be described. In the following range of the x-coordinate in the horizontal direction, the sag amount z is expressed as a conic curve that is not corrected, as indicated by the equation above described in the section <Reference Lens>. Meanwhile, the correction performed at the skirt is performed in the following range of the x-coordinate in the horizontal direction with its center on the axis of symmetry of the meridian.

23

$$|x| \geq \frac{L}{2} - \Delta x \qquad \text{[Math. 64]}$$

The sag amount z is expressed as a conic curve corrected as indicated by the following equation.

$$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^{\gamma} \Delta z \right) \qquad \text{[Math. 65]}$$

Herein, $\Delta x$ is expressed as follows.

$$\Delta x = 0.1\alpha(\gamma + 1.2)\sqrt{0.375\lambda r} \qquad \text{[Math. 66]}$$

Furthermore, $\Delta z$ is expressed as follows.

$$\Delta z = \frac{\beta \lambda}{2} \qquad \text{[Math. 67]}$$

L is the width of the meridian, and $\alpha$ is a real number no smaller than 0.5 nor greater than 2. In one aspect, a is 1. Meanwhile, $\beta$ is a real number no smaller than 0.15 nor greater than 0.6. In one aspect, $\beta$ is 0.3, $\gamma$ is a real number no smaller than 1 nor greater than 10, r is the radius of curvature of the conic curve, and $\lambda$ is the wavelength of the visible light rays. In one preferred aspect, $\alpha$ is a real number no smaller than 0.9 nor greater than 1.1, $\beta$ is a real number no smaller than 0.25 nor greater than 0.35, and $\gamma$ is a real number no smaller than 2 nor greater than 10.

Figure 27:
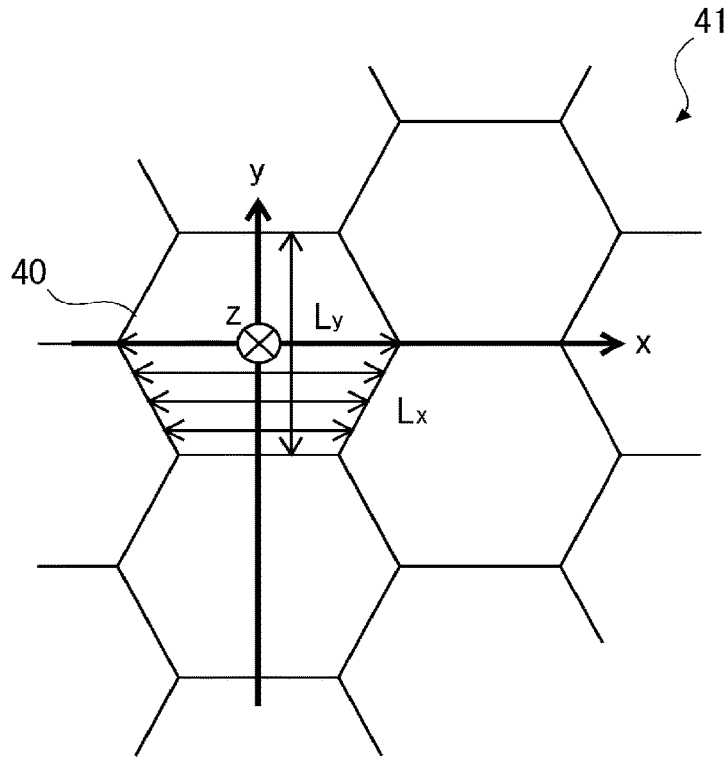
FIG. 27 is a plan view of a microlens array.
Figure 27:
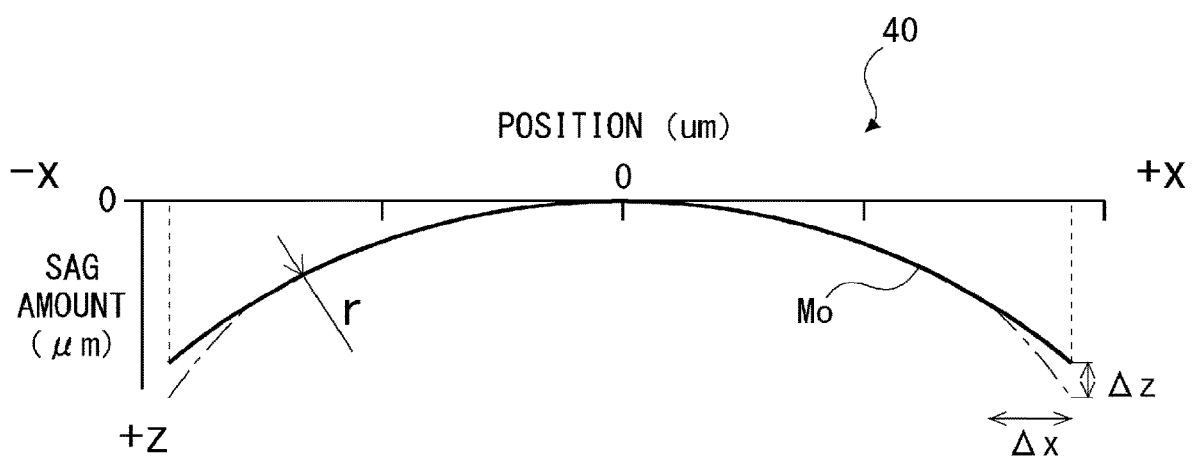

Modified Example 4: Microlens Array Composed of Hexagonal Convex Microlenses The upper section of FIG. 27 shows a microlens array 41 viewed in plan view. The microlens array 41 includes a lens 40 of a right hexagonal shape and other lenses having the same shape as the lens 40 as viewed in plan view. As with the microlens array 31 shown in FIG. 1, the lens 40 and the other lenses are arrayed in a hexagonal lattice on an array surface. In this example, the hexagonal lattice is a right hexagonal lattice.

As shown in FIG. 27, the x-axis and the y-axis are set with the center of the lens 40 being the origin. The x-axis is parallel to opposing two sides of the lens 40 viewed in plan view. The y-axis is orthogonal to the opposing two sides of the lens 40 viewed in plan view. The y-axis is parallel to a lattice direction. The x-axis is orthogonal to this lattice direction.

As shown in FIG. 27, the length, in the x-axis direction, of the lens 40 cut along a plane parallel to the xz-plane and viewed in plan view is denoted by $L_x$. $L_x$ is a function of y. The length, in the y-axis direction, of the lens 40 cut along a plane parallel to the yz-plane and viewed in plan view is denoted by $L_y$. $L_y$ is a function of x. The lens has a convex surface that is cylindrical throughout the sections that are parallel to the x-axis direction and are orthogonal to the array surface. The lens 40 has a convex surface that is cylindrical throughout the sections that are parallel to the y-axis direction and are orthogonal to the array surface.

The lower section of FIG. 27 shows a section of the lens 40 cut along a plane parallel to the xz-plane. In both sections, the lens 40 equally has a meridian Mo of a radius of curvature r. The meridian Mo is a conic curve. A conic curve includes an ellipse, a parabola, and a hyperbola. An ellipse includes a circle. A conic curve does not include two straight lines. In a section of the lens 40 cut along a plane parallel to the yz-plane as well, the lens 40 has a meridian composed of an equally determined radius of curvature. This meridian is a conic curve. A conic curve includes an ellipse, a parabola, and a hyperbola. An ellipse includes a circle. A conic curve does not include two straight lines.

In each of the meridians Mo of the sections parallel to the lattice direction of the lens 40, the sag amount is corrected so as to increase the inclination of the skirt. In other words, the sag amount of the lens 40 increases in the +z-direction. Furthermore, the range in the x-axis in which the sag amount is corrected is set. Such an axis is simply referred to below as the x-axis or the x-coordinate. The microlens array 41 can be suitably used as a transmissive screen. Meanwhile, a transmissive screen can be suitably used in a head-up display.

In FIG. 27, in the following range $\Delta x$ of the x-coordinate in the horizontal direction along a section parallel to the xz-plane, the sag amount z is expressed as a conic curve that is not corrected, as indicated by the following equation. The correction amount of the sag amount is denoted by $\Delta z$. $L_x$ is the width of the lens. The width L. of the lens varies in accordance with the y-coordinate on the section.

In the following range of the horizontal coordinate x, $$|x| \geq \frac{L_x}{2} - \Delta x \qquad \text{[Math. 68]}$$

the sag amount z is expressed as a conic curve that is not corrected, as indicated by the following equation.

$$z = \left( \frac{(1/r_x) \cdot x^2}{1 + \sqrt{1 - (1+k_x) \cdot (1/r_x)^2 \cdot x^2}} \right) \qquad \text{[Math. 69]}$$

In the following range of the horizontal coordinate x, $$|x| \geq \frac{L_x}{2} - \Delta x \qquad \text{[Math. 70]}$$

the sag amount z is expressed as a conic curve corrected as indicated by the following equation.

$$z = \left( \frac{(1/r_x) \cdot x^2}{1 + \sqrt{1 - (1+k_x) \cdot (1/r_x)^2 \cdot x^2}} \right) + \left( \frac{x + \Delta x - L_x/2}{\Delta x} \right)^{\gamma_x} \Delta z \qquad \text{[Math. 71]}$$

Herein, $\Delta x$ and $\Delta z$ are expressed as follows.

$$\Delta x = 0.1\alpha_x(\gamma_x + 1.2)\sqrt{\frac{0.75\lambda r_x}{n-1}} \qquad \text{[Math. 72]}$$

$$\Delta z = \frac{\beta_x \lambda}{n-1} \qquad \text{[Math. 73]}$$

In the above, $r_x$ is the radius of curvature of the conic curve, $k_x$ is the conic constant, $\alpha_x$ is a real number no smaller than 0.5 nor greater than 2, $\beta_x$ is a real number no smaller than 0.15 nor greater than 0.6, $y_x$ is a real number no smaller than 1 nor greater than 10, 2 is the wavelength of the visible light rays, and n is the absolute refractive index of the lens.

In a similar manner, in the following range $\Delta y$ of the y-coordinate along a section parallel to the yz-plane, the sag amount z is expressed as a conic curve that is not corrected, as indicated by the following equation. The correction amount of the sag amount is denoted by $\Delta z$. $L_y$ is the width of the lens. The width $L_y$ of the lens varies in accordance with the x-coordinate on the section.

In the following range of the horizontal coordinate y, $$|y| < \frac{L_y}{2} - \Delta y \qquad \text{[Math. 74]}$$

the sag amount z is expressed as a conic curve that is not corrected, as indicated by the following equation.

$$z = \left( \frac{(1/r_y) \cdot y^2}{1 + \sqrt{1 - (1 + k_y) \cdot (1/r_y)^2 \cdot y^2}} \right) \qquad \text{[Math. 75]}$$

In the following range of the horizontal coordinate y, $$|y| < \frac{L_y}{2} - \Delta y \qquad \text{[Math. 76]}$$

the sag amount z is expressed as a conic curve corrected as indicated by the following equation.

$$z = \left( \frac{(1/r_y) \cdot y^2}{1 + \sqrt{1 - (1 + k_y) \cdot (1/r_y)^2 \cdot y^2}} \right) + \left( \frac{y + \Delta y - L_y/2}{\Delta y} \right)^{\gamma_y} \Delta z \qquad \text{[Math. 77]}$$

Herein, $\Delta y$ and $\Delta z$ are expressed as follows.

$$\Delta y = 0.1 \alpha_y (\gamma_y + 1.2) \sqrt{\frac{0.75 \lambda r_y}{n - 1}} \qquad \text{[Math. 78]}$$

$$\Delta z = \frac{\beta_y \lambda}{n - 1} \qquad \text{[Math. 79]}$$

In the above, $r_y$ is the radius of curvature of the conic curve, $k_y$ is the conic constant, $\alpha_y$ is a real number no smaller than 0.5 nor greater than 2, $\beta_y$ is a real number no smaller than 0.15 nor greater than 0.6, $\gamma_y$ is a real number no smaller than 1 nor greater than 10, $\lambda$ is the wavelength of the visible light rays, and n is the absolute refractive index of the lens.

Figure 28:
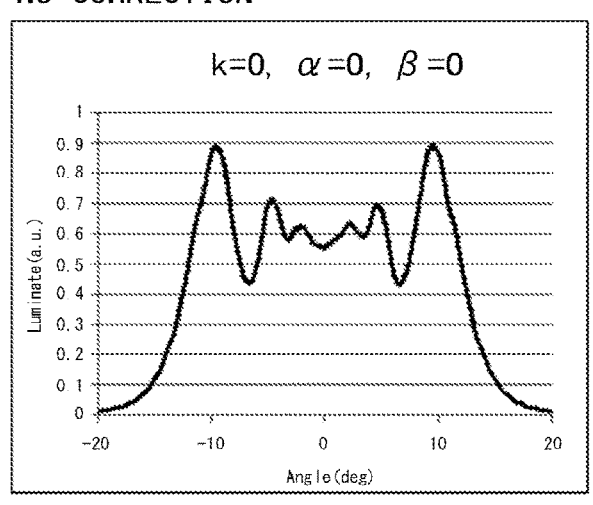
FIG. 28 shows luminance distributions and observation images.
Figure 28:
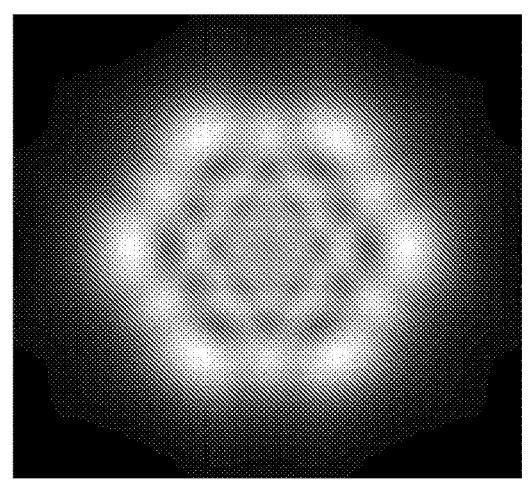
Figure 28:
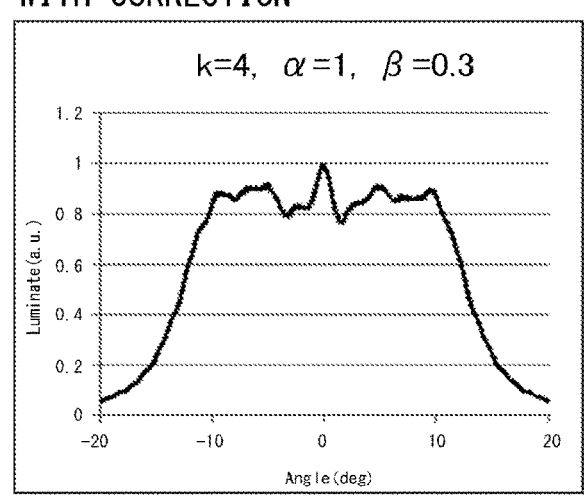
Figure 28:
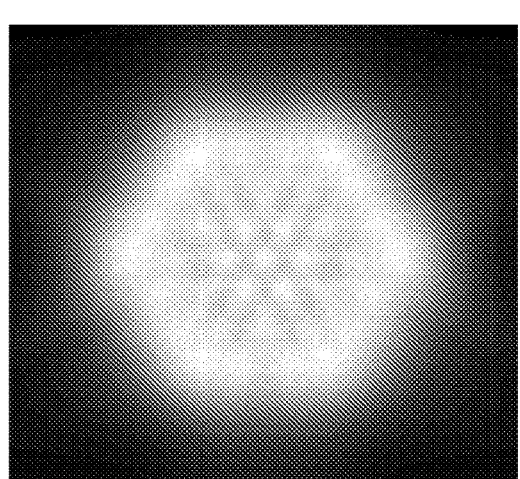

The luminance distributions and the observation images shown in FIG. 28 are those for a lens with a pitch of 30 µm. In the case with correction, $k_x = k_y = 4$, $\alpha_x = \alpha_y = 1$, and $\beta_x = \beta_y = 0.3$ are adopted. The same applies below. The ripples are reduced through the correction of the skirt.

Figure 29:
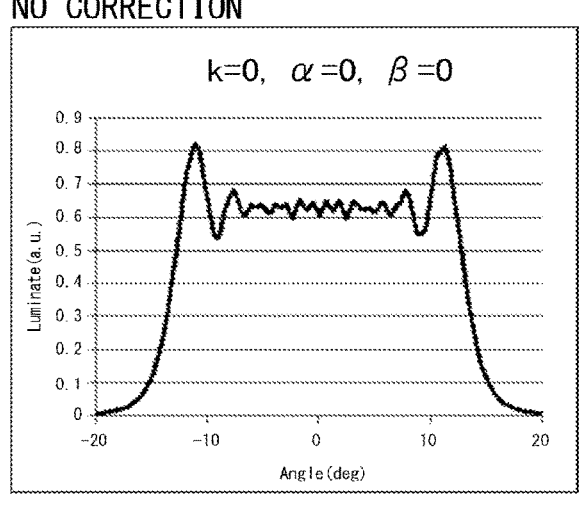
FIG. 29 shows luminance distributions and observation images.
Figure 29:
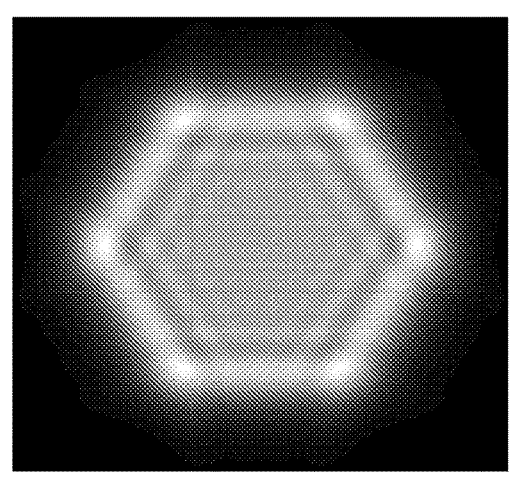
Figure 29:
Figure 29:
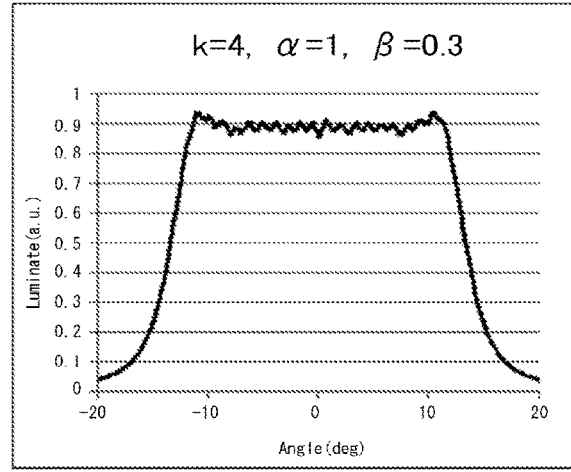
Figure 29:
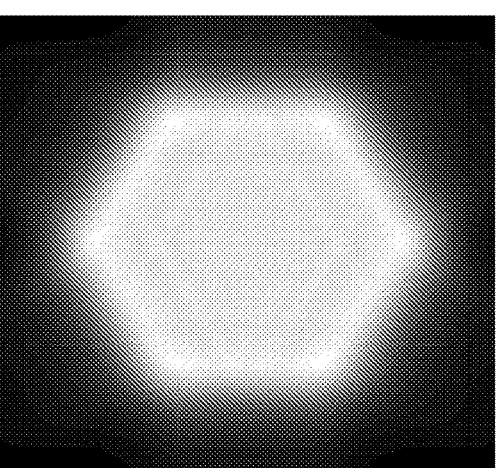

The luminance distributions and the observation images shown in FIG. 29 are those for a lens with a pitch of 60 µm. The ripples are reduced through the correction of the skirt.

Figure 30:
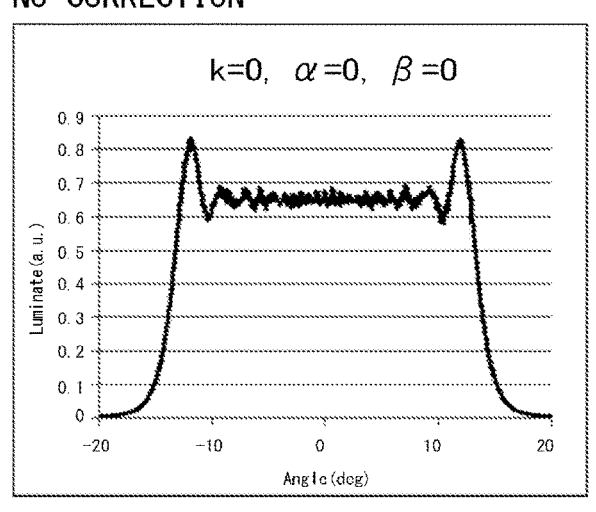
FIG. 30 shows luminance distributions and observation images.
Figure 30:
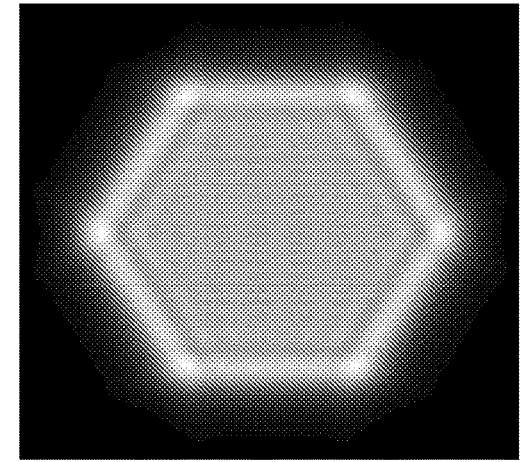
Figure 30:
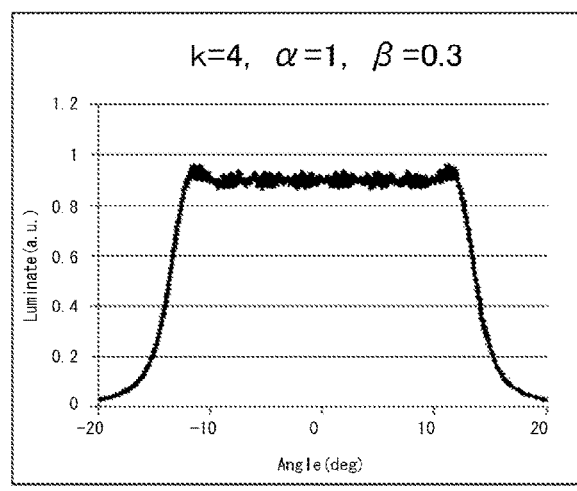
Figure 30:
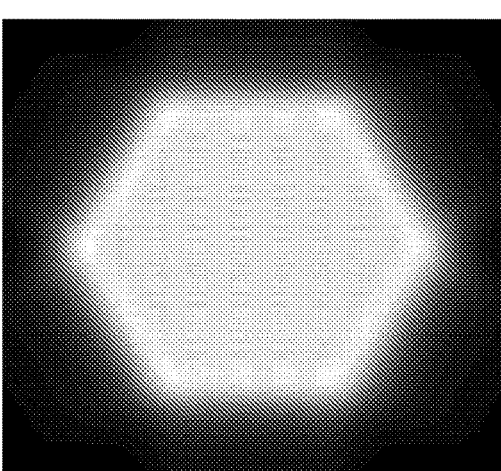

The luminance distributions and the observation images shown in FIG. 30 are those for a lens with a pitch of 100 µm. The ripples are reduced through the correction of the skirt.

Figure 31:
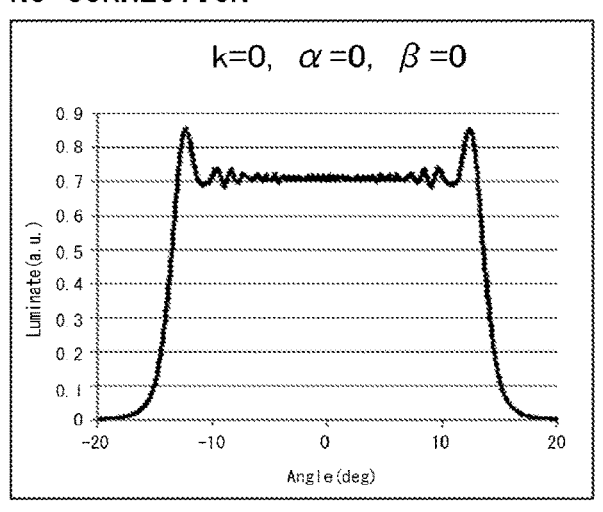
FIG. 31 shows luminance distributions and observation images.
Figure 31:
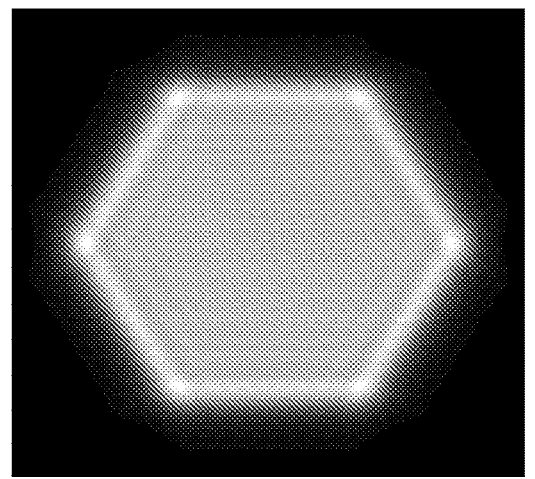
Figure 31:
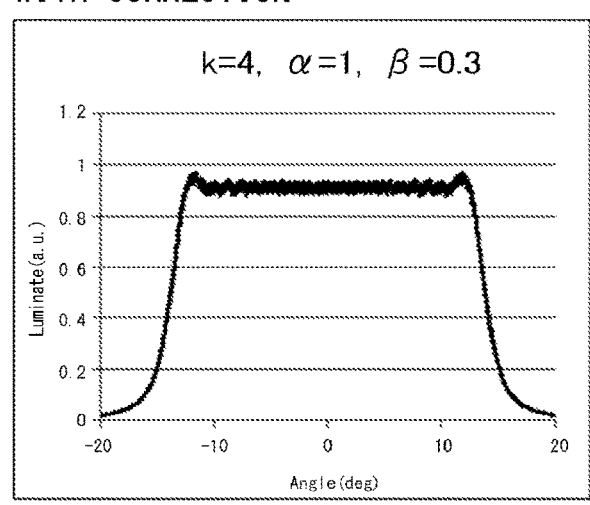
Figure 31:
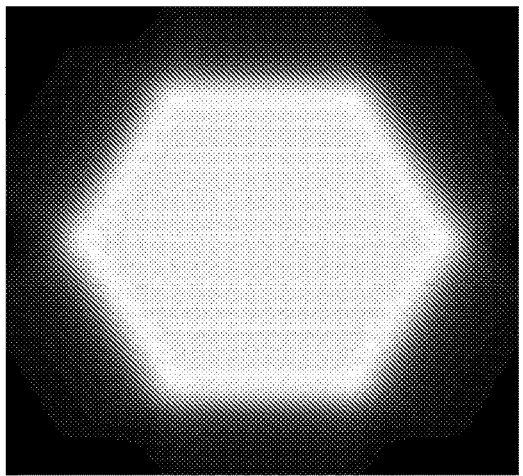

The luminance distributions and the observation images shown in FIG. 31 are those for a lens with a pitch of 150 µm. The ripples are reduced through the correction of the skirt.

Modified Example 5: Microlens Array Composed of Hexagonal Concave Microlens

Another aspect of a diffusion plate of a micro array type is a microlens array in which right hexagonal concave lenses are arrayed in a lattice on an array surface. Each concave lens has a concave surface that is cylindrical throughout the sections that are parallel to opposing two sides of the concave lens viewed in plan view and are orthogonal to the array surface. Each concave lens has a concave surface that is cylindrical throughout the sections that are orthogonal to the aforementioned opposing two sides and are orthogonal to the array surface. In one aspect, the lattice is a right hexagonal lattice. In each of the meridians of the sections parallel to the lattice direction of the concave lens, the sag amount is corrected so as to increase the inclination of the rim. The rim rises slightly through the correction.

The range in which the sag amount is corrected is set in the direction parallel to the opposing two sides and in the direction orthogonal to that direction, that is, in the x-axis direction and in the y-axis direction. The y-axis is parallel to a lattice direction. The x-axis is orthogonal to this lattice direction. The size of the range in the horizontal direction in which the sag amount is corrected in the x-axis direction is denoted by $\Delta x$. The correction amount of the sag amount is denoted by $\Delta z$. In the following range of the x-coordinate, the sag amount z is expressed as a conic curve that is not corrected, as indicated by the following equation, in which Lx is the width of the lens. The width Lx of the lens varies in accordance with the y-coordinate on the section. Herein, $k_x$ is the conic constant, and $r_x$ is the radius of curvature of the conic curve.

$$|x| < \frac{L_x}{2} - \Delta x \qquad \text{[Math. 80]}$$

$$z = \frac{(1/r_x) \cdot x^2}{1 + \sqrt{1 - (1 + k_x) \cdot (1/r_x)^2 \cdot x^2}} \qquad \text{[Math. 81]}$$

Meanwhile, it is preferable that the correction performed at the rim be performed in the following range of the x-coordinate in the horizontal direction with its center on the axis of symmetry of the meridian.

$$|x| \geq \frac{L_x}{2} - \Delta x \qquad \text{[Math. 82]}$$

The size $\Delta x$ of the range in the horizontal direction in which the sag amount is corrected is expressed as follows.

$$\Delta x = 0.1 (\gamma_x + 1.2) \sqrt{\frac{0.75 \lambda r_x}{n - 1}} \qquad \text{[Math. 83]}$$

In the above, $\gamma_x$ is a real number representing the order of correction. Preferably, $1 \leq \gamma_x \leq 10$ holds; preferably, $2 < \gamma_x$ holds; or preferably, $3 < \gamma_x$ holds. The skirt becomes a straight line when $\gamma_x = 1$. In the above, $\lambda$ is the wavelength of the light rays, n is the absolute refractive index of the lens, and n is approximated by the relative refractive index of the lens with respect to the air.

The correction amount $\Delta z$ of the sag amount is expressed as follows.

$$\Delta z = \frac{0.3\lambda}{n-1} \qquad \text{[Math. 84]}$$

The sag amount z is expressed as a conic curve corrected as indicated by the following equation.

$$z = \left( \frac{(1/r_x) \cdot x^2}{1 + \sqrt{1 - (1 + k_x) \cdot (1/r_x)^2 \cdot x^2}} + \left( \frac{x + \Delta x - L_x/2}{\Delta x} \right)^{\gamma_x} \Delta z \right) \qquad \text{[Math. 85]}$$

The size of the range in the horizontal direction in which the sag amount is corrected in the y-axis direction is denoted by $\Delta y$. The correction amount of the sag amount is denoted by $\Delta z$. In the following range of the y-coordinate, the sag amount z is expressed as a conic curve that is not corrected, as indicated by the following equation, in which $L_y$ is the width of the lens. The width $L_y$ of the lens varies in accordance with the x-coordinate on the section. Herein, $k_y$ is the conic constant, and $r_y$ is the radius of curvature of the conic curve.

$$|y| < \frac{L_y}{2} - \Delta y \qquad \text{[Math. 86]}$$

$$z = \frac{(1/r_y) \cdot y^2}{1 + \sqrt{1 - (1 + k_y) \cdot (1/r_y)^2 \cdot y^2}} \qquad \text{[Math. 87]}$$

Meanwhile, it is preferable that the correction performed at the rim be performed in the following range of the y-coordinate in the horizontal direction with its center on the axis of symmetry of the meridian.

$$|y| \geq \frac{L_y}{2} - \Delta y \qquad \text{[Math. 88]}$$

The size $\Delta y$ of the range in the horizontal direction in which the sag amount is corrected is expressed as follows.

$$\Delta y = 0.1(\gamma_y + 1.2)\sqrt{\frac{0.75\lambda r_y}{n-1}} \qquad \text{[Math. 89]}$$

In the above, $\gamma_y$ is a real number representing the order of correction. Preferably, $1 \leq \gamma_y \leq 10$ holds; preferably, $2 < \gamma_y$ holds; or preferably, $3 < \gamma_y$ holds. The skirt becomes a straight line when $\gamma_y = 1$. In the above, $\lambda$ is the wavelength of the light rays, n is the absolute refractive index of the lens, and n is approximated by the relative refractive index of the lens with respect to the air.

The correction amount $\Delta z$ of the sag amount is expressed as follows.

$$\Delta z = \frac{0.3\lambda}{n-1} \qquad \text{[Math. 90]}$$

The sag amount z is expressed as a conic curve corrected as indicated by the following equation.

$$z = \left( \frac{(1/r_y) \cdot y^2}{1 + \sqrt{1 - (1 + k_y) \cdot (1/r_y)^2 \cdot y^2}} + \left( \frac{y + \Delta y - L_y/2}{\Delta y} \right)^{\gamma_y} \Delta z \right) \qquad \text{[Math. 91]}$$

Modified Example 6: Reflective Diffusion Plate of Hexagonal Concave Mirror Array Type Another aspect of a diffusion plate of a micro array type is a concave micromirror array in which right hexagonal concave mirrors are arrayed in a lattice on an array surface. Each concave mirror has a concave surface that is cylindrical throughout the sections that are parallel to opposing two sides of the concave mirror viewed in plan view and are orthogonal to the array surface. Each concave mirror has a concave surface that is cylindrical throughout the sections that are orthogonal to the aforementioned opposing two sides and are orthogonal to the array surface. In one aspect, the lattice is a right hexagonal lattice. In each of the meridians of the sections parallel to the lattice direction of the concave mirror, the sag amount is corrected so as to increase the inclination of the rim. The rim rises slightly through the correction.

The range in which the sag amount is corrected is set in the direction parallel to the opposing two sides and in the direction orthogonal to that direction, that is, in the x-axis direction and in the y-axis direction. The y-axis is parallel to a lattice direction. The x-axis is orthogonal to this lattice direction. The size of the range in the horizontal direction in which the sag amount is corrected in the x-axis direction is denoted by $\Delta x$. The correction amount of the sag amount is denoted by $\Delta z$. In the following range of the x-coordinate, the sag amount z is expressed as a conic curve that is not corrected, as indicated by the following equation, in which Lx is the width of the lens. The width Lx of the lens varies in accordance with the y-coordinate on the section. Herein, $k_x$ is the conic constant, and $r_x$ is the radius of curvature of the conic curve.

$$|x| < \frac{L_x}{2} - \Delta x \qquad \text{[Math. 92]}$$

$$z = \frac{(1/r_x) \cdot x^2}{1 + \sqrt{1 - (1 + k_x) \cdot (1/r_x)^2 \cdot x^2}} \qquad \text{[Math. 93]}$$

Meanwhile, it is preferable that the correction performed at the rim be performed in the following range of the x-coordinate in the horizontal direction with its center on the axis of symmetry of the meridian.

$$|x| \geq \frac{L_x}{2} - \Delta x \qquad \text{[Math. 94]}$$

The size $\Delta x$ of the range in the horizontal direction in which the sag amount is corrected is expressed as follows.

$$\Delta x = 0.1(\gamma_x + 1.2)\sqrt{0.375\lambda r_x} \qquad \text{[Math. 95]}$$

In the above, $\gamma_x$ is a real number representing the order of correction. Preferably, $1 \leq \gamma_x \leq 10$ holds; preferably, $2 < \gamma_x$ holds; or preferably, $3 < \gamma_x$ holds. The skirt becomes a straight line when $\gamma_x = 1$. In the above, $\lambda$ is the wavelength of the light rays, n is the absolute refractive index of the lens, and n is approximated by the relative refractive index of the lens with respect to the air.

The correction amount $\Delta z$ of the sag amount is expressed as follows.

$$\Delta z = 0.15\lambda \qquad \text{[Math. 96]}$$

The sag amount z is expressed as a conic curve corrected as indicated by the following equation.

$$z = \left( \frac{(1/r_x) \cdot x^2}{1 + \sqrt{1 - (1 + k_x) \cdot (1/r_x)^2 \cdot x^2}} + \left( \frac{x + \Delta x - L_x/2}{\Delta x} \right)^{\gamma_x} \Delta z \right) \qquad \text{[Math. 97]}$$

The size of the range in the horizontal direction in which the sag amount is corrected in the y-axis direction is denoted by $\Delta y$. The correction amount of the sag amount is denoted by $\Delta z$. In the following range of the y-coordinate, the sag amount z is expressed as a conic curve that is not corrected, as indicated by the following equation, in which $L_y$ is the width of the lens. The width $L_y$ of the lens varies in accordance with the x-coordinate on the section. Herein, $k_y$ is the conic constant, and $r_y$ is the radius of curvature of the conic curve.

$$|y| < \frac{L_y}{2} - \Delta y \qquad \text{[Math. 98]}$$

$$z = \frac{(1/r_y) \cdot y^2}{1 + \sqrt{1 - (1 + k_y) \cdot (1/r_y)^2 \cdot y^2}} \qquad \text{[Math. 99]}$$

Meanwhile, it is preferable that the correction performed at the rim be performed in the following range of the y-coordinate in the horizontal direction with its center on the axis of symmetry of the meridian.

$$|y| \geq \frac{L_y}{2} - \Delta y \qquad \text{[Math. 100]}$$

The size $\Delta y$ of the range in the horizontal direction in which the sag amount is corrected is expressed as follows.

$$\Delta x = 0.1(\gamma_y + 1.2)\sqrt{0.375\lambda r_y} \qquad \text{[Math. 101]}$$

In the above, $\gamma_y$ is a real number representing the order of correction. Preferably, $1 \leq \gamma_y \leq 10$ holds; preferably, $2 < \gamma_y$ holds; or preferably, $3 < \gamma_y$ holds. The skirt becomes a straight line when $\gamma_y = 1$. In the above, $\lambda$ is the wavelength of the light rays, n is the absolute refractive index of the lens, and n is approximated by the relative refractive index of the lens with respect to the air.

The correction amount $\Delta z$ of the sag amount is expressed as follows.

$$\Delta z = 0.15\lambda \qquad \text{[Math. 102]}$$

The sag amount z is expressed as a conic curve corrected as indicated by the following equation.

$$z = \left( \frac{(1/r_y) \cdot y^2}{1 + \sqrt{1 - (1 + k_y) \cdot (1/r_y)^2 \cdot y^2}} + \left( \frac{y + \Delta y - L_y/2}{\Delta y} \right)^{\gamma_y} \Delta z \right) \qquad \text{[Math. 103]}$$

Modified Example 7: Reflective Diffusion Plate of Hexagonal Convex Mirror Array Type Another aspect of a diffusion plate of a micro array type is a convex micromirror array in which right hexagonal convex mirrors are arrayed in a lattice on an array surface. Each convex mirror has a concave surface that is cylindrical throughout the sections that are parallel to opposing two sides of the convex mirror viewed in plan view and are orthogonal to the array surface. Each convex mirror has a concave surface that is cylindrical throughout the sections that are orthogonal to the aforementioned opposing two sides and are orthogonal to the array surface. In one aspect, the lattice is a right hexagonal lattice. In each of the meridians of the sections parallel to the lattice direction of the convex mirror, the sag amount is corrected so as to increase the inclination of the skirt. The skirt falls slightly through the correction.

The range in which the sag amount is corrected is set in the direction parallel to opposing two sides and in the direction orthogonal to that direction, that is, in the x-axis direction and in the y-axis direction. The y-axis is parallel to a lattice direction. The x-axis is orthogonal to this lattice direction. The size of the range in the horizontal direction in which the sag amount is corrected in the x-axis direction is denoted by $\Delta x$. The correction amount of the sag amount is denoted by $\Delta z$. In the following range of the x-coordinate, the sag amount z is expressed as a conic curve that is not corrected, as indicated by the following equation, in which Lx is the width of the lens. The width Lx of the lens varies in accordance with the y-coordinate on the section. Herein, $k_x$ is the conic constant, and $r_x$ is the radius of curvature of the conic curve.

$$|x| < \frac{L_x}{2} - \Delta x \qquad \text{[Math. 104]}$$

$$z = \frac{(1/r_x) \cdot x^2}{1 + \sqrt{1 - (1 + k_x) \cdot (1/r_x)^2 \cdot x^2}} \qquad \text{[Math. 105]}$$

Meanwhile, it is preferable that the correction performed at the skirt be performed in the following range of the x-coordinate in the horizontal direction with its center on the axis of symmetry of the meridian.

$$|x| \geq \frac{L_x}{2} - \Delta x \qquad \text{[Math. 106]}$$

The size $\Delta x$ of the range in the horizontal direction in which the sag amount is corrected is expressed as follows.

$$\Delta x = 0.1(\gamma_x + 1.2)\sqrt{0.375\lambda r_x} \qquad \text{[Math. 107]}$$

In the above, $\gamma_x$ is a real number representing the order of correction. Preferably, $1 \leq \gamma_x \leq 10$ holds; preferably, $2 < \gamma_x$ holds; or preferably, $3 < \gamma_x$ holds. The skirt becomes a straight line when $\gamma_x = 1$. In the above, $\lambda$ is the wavelength of the light rays, n is the absolute refractive index of the lens, and n is approximated by the relative refractive index of the lens with respect to the air.

The correction amount $\Delta z$ of the sag amount is expressed as follows.

$$\Delta z = 0.15\lambda \qquad \text{[Math. 108]}$$

The sag amount z is expressed as a conic curve corrected as indicated by the following equation.

$$z = \left( \frac{(1/r_x) \cdot x^2}{1 + \sqrt{1 - (1 + k_x) \cdot (1/r_x)^2 \cdot x^2}} + \left( \frac{x + \Delta x - L_x/2}{\Delta x} \right)^{\gamma_x} \Delta z \right)$$ [Math. 109]

The size of the range in the horizontal direction in which the sag amount is corrected in the y-axis direction is denoted by $\Delta y$. The correction amount of the sag amount is denoted by $\Delta z$. In the following range of the y-coordinate, the sag amount z is expressed as a conic curve that is not corrected, as indicated by the following equation, in which $L_y$ is the width of the lens. The width $L_y$ of the lens varies in accordance with the x-coordinate on the section. Herein, $k_y$ is the conic constant, and $r_y$ is the radius of curvature of the conic curve.

$$|y| < \frac{L_x}{2} - \Delta y$$ [Math. 110]

$$z = \frac{(1/r_y) \cdot y^2}{1 + \sqrt{1 - (1 + k_y) \cdot (1/r_y)^2 \cdot y^2}}$$ [Math. 111]

Meanwhile, it is preferable that the correction performed at the skirt be performed in the following range of the y-coordinate in the horizontal direction with its center on the axis of symmetry of the meridian.

$$|y| \geq \frac{L_y}{2} - \Delta y$$ [Math. 112]

The size $\Delta y$ of the range in the horizontal direction in which the sag amount is corrected is expressed as follows.

$$\Delta y = 0.1(\gamma_y + 1.2)\sqrt{0.375\lambda r_y}$$ [Math. 113]

In the above, $\gamma_y$ is a real number representing the order of correction. Preferably, $1 \leq \gamma_y \leq 10$ holds; preferably, $2 < \gamma_y$ holds; or preferably, $3 < \gamma_y$ holds. The skirt becomes a straight line when $\gamma_y = 1$. In the above, $\lambda$ is the wavelength of the light rays, n is the absolute refractive index of the lens, and n is approximated by the relative refractive index of the lens with respect to the air.

The correction amount $\Delta z$ of the sag amount is expressed as follows.

$$\Delta z = 0.15\lambda$$ [Math. 114]

The sag amount z is expressed as a conic curve corrected as indicated by the following equation.

$$z = \left( \frac{(1/r_y) \cdot y^2}{1 + \sqrt{1 - (1 + k_y) \cdot (1/r_y)^2 \cdot y^2}} + \left( \frac{y + \Delta y - L_y/2}{\Delta y} \right)^{\gamma_y} \Delta z \right)$$ [Math. 115]

This application is based upon and claims the benefit of priority from Japanese Patent Application No. 2020-190843, filed on Nov. 17, 2020, the entire disclosure of which is incorporated herein in its entirety by reference.

REFERENCE SIGNS LIST

30 LENS
31 MICROLENS ARRAY
32 ARRAY SURFACE
34 CONVEX LENS SURFACE
35 BEAM

Fx FOCAL POINT
Fy FOCAL POINT
Lc LUMINANCE CURVE
Lo LUMINANCE CURVE
Mc MERIDIAN
Mo MERIDIAN
Px PITCH
Py PITCH
Sx SECTION
Sy SECTION
$\theta c$ DIVERGENCE ANGLE
$\theta o$ DIVERGENCE ANGLE
$2\theta c$ TAPER
$2\theta o$ TAPER
$2\theta x$ TAPER
$2\theta y$ TAPER

The invention claimed is:

1. A microlens array in which lenses are arrayed longitudinally and laterally on an array surface, wherein when a longitudinal direction and a lateral direction of an array of the lenses are regarded as a longitudinal direction and a lateral direction of a lens among the lenses, the lens has a cross-cylindrical convex lens surface composed of a combination of a convex surface that is cylindrical along the lateral direction throughout sections that are parallel to the longitudinal direction of the lens and are orthogonal to the array surface and a convex surface that is cylindrical along the longitudinal direction throughout sections that are parallel to the lateral direction of the lens and are orthogonal to the array surface, and a sag amount is corrected so as to increase an inclination of a skirt in each of meridians of the sections parallel to the longitudinal direction and meridians of the sections parallel to the lateral direction, wherein the meridians of the sections parallel to the longitudinal direction and of the sections parallel to the lateral direction are each composed of a conic curve of which the sag amount is corrected, and wherein in the following range of a horizontal coordinate x with its center on an axis of symmetry of the meridians, $$|x| \geq \frac{L}{2} - \Delta x$$

a sag amount z is expressed as a conic curve corrected as indicated by the following equation, $$z = \left( \frac{(1/r) \cdot x^2}{1 + \sqrt{1 - (1 + k) \cdot (1/r)^2 \cdot x^2}} + \left( \frac{x + \Delta x - L/2}{\Delta x} \right)^{\gamma} \Delta z \right)$$

wherein, $\Delta x$ and $\Delta z$ are expressed as follows, $$\Delta x = 0.1\alpha(\gamma + 1.2)\sqrt{\frac{0.75\lambda r}{n - 1}}$$

$$\Delta z = \frac{\beta\lambda}{n - 1}$$

L is a width of the meridians, r is a radius of curvature of the conic curve, k is a conic constant, $\alpha$ is a real number no smaller than 0.5 nor greater than 2, β is a real number no smaller than 0.15 nor greater than 0.6, γ is a real number no smaller than 1 nor greater than 10, λ is a wavelength of a visible light ray, and n is an absolute refractive index of the lens.

2. The microlens array according to claim 1, wherein α is a real number no smaller than 0.9 nor greater than 1.1, β is a real number no smaller than 0.25 nor greater than 0.35, and γ is a real number no smaller than 2 nor greater than 10.

3. The microlens array according to claim 1, wherein λ is 650 nm.

4. The microlens array according to claim 1, wherein λ is 530 nm.

5. The microlens array according to claim 1, wherein in the following range of the horizontal coordinate x, $$|x| < \frac{L}{2} - \Delta x$$

the sag amount z is expressed as a conic curve that is not corrected, as indicated by the following equation $$z = \frac{(1/r) \cdot x^2}{1 + \sqrt{1 - (1+k) \cdot (1/r)^2 \cdot x^2}}.$$

6. The microlens array according to claim 1, wherein each of the lenses is a rectangular lens, and a longitudinal direction and a lateral direction of the rectangular lens match the longitudinal direction and the lateral direction of the array of the lenses.

7. The microlens array according to claim 1, wherein the convex lens surface has a divergence angle in the longitudinal direction different from that in the lateral direction.

8. A microlens array in which lenses are arrayed longitudinally and laterally on an array surface, wherein
when a longitudinal direction and a lateral direction of an array of the lenses are regarded as a longitudinal direction and a lateral direction of a lens among the lenses, the lens has a cross-cylindrical concave lens surface composed of a combination of a concave surface that is cylindrical along the lateral direction throughout sections that are parallel to the longitudinal direction of the lens and are orthogonal to the array surface and a concave surface that is cylindrical along the longitudinal direction throughout sections that are parallel to the lateral direction of the lens and are orthogonal to the array surface, and
a sag amount is corrected so as to increase an inclination of a rim in each of meridians of the sections parallel to the longitudinal direction and meridians of the sections parallel to the lateral direction,
wherein the meridians of the sections parallel to the longitudinal direction and of the sections parallel to the lateral direction are each composed of a conic curve of which the sag amount is corrected, and
wherein
in the following range of a horizontal coordinate x with its center on an axis of symmetry of the meridians, $$|x| \geq \frac{L}{2} - \Delta x$$

a sag amount z is expressed as a conic curve corrected as indicated by the following equation, $$z = \left( \frac{(1/r) \cdot x^2}{1 + \sqrt{1 - (1+k) \cdot (1/r)^2 \cdot x^2}} + \left( \frac{x + \Delta x - L/2}{\Delta x} \right)^y \Delta z \right)$$

wherein, Δx and Δz are expressed as follows, $$\Delta x = 0.1\alpha(\gamma + 1.2)\sqrt{\frac{0.75\lambda r}{n-1}}$$

$$\Delta z = \frac{\beta\lambda}{2}$$

L is a width of the meridians, r is a radius of curvature of the conic curve, k is a conic constant, α is a real number no smaller than 0.5 nor greater than 2, β is a real number no smaller than 0.15 nor greater than 0.6, γ is a real number no smaller than 1 nor greater than 10, λ is a wavelength of a visible light ray, and n is an absolute refractive index of the lens.

9. A transmissive screen comprising:
the microlens array according to claim 1.

10. A head-up display comprising:
the transmissive screen according to claim 9.

11. A concave micromirror array in which concave mirrors are arrayed longitudinally and laterally on an array surface, wherein
when a longitudinal direction and a lateral direction of the concave mirrors are regarded as a longitudinal direction and a lateral direction of a concave mirror among the concave mirrors, the concave mirror has a cross-cylindrical concave surface composed of a combination of a concave surface that is cylindrical along the lateral direction throughout sections that are parallel to the longitudinal direction of the concave mirror and are orthogonal to the array surface and a concave surface that is cylindrical along the longitudinal direction throughout sections that are parallel to the lateral direction of the concave mirror and are orthogonal to the array surface, and
a sag amount is corrected so as to increase an inclination of a rim in each of meridians of the sections parallel to the longitudinal direction and meridians of the sections parallel to the lateral direction,
wherein the meridians of the sections parallel to the longitudinal direction and the meridians of the sections parallel to the lateral direction are each composed of a conic curve of which the sag amount is corrected, and
wherein
in the following range of a horizontal coordinate x with its center on an axis of symmetry of the meridians, $$|x| \geq L/2 - \Delta x$$

a sag amount z is expressed as a conic curve corrected as indicated by the following equation, $$z = ((1/r) \cdot x^2/1 + \sqrt{1 - (1+k) \cdot (1/r)^2 \cdot x^2} + (x + \Delta x - L/2/\Delta x)^y \Delta z)$$

wherein, Δx and Δz are expressed as follows, $$\Delta x = 0.1\alpha(\gamma + 1.2)\sqrt{0.375\lambda r}$$

$$\Delta z = \beta\lambda/2$$

L is a width of the meridians, $\alpha$ is a real number no smaller than 0.5 nor greater than 2, $\beta$ is a real number no smaller than 0.15 nor greater than 0.6, $\gamma$ is a real number no smaller than 1 nor greater than 10, r is a radius of curvature of the conic curve, and $\lambda$ is a wavelength of a visible light ray.

12. The concave micromirror array according to claim 11, wherein $\alpha$ is a real number no smaller than 0.9 nor greater than 1.1, $\beta$ is a real number no smaller than 0.25 nor greater than 0.35, and $\gamma$ is a real number no smaller than 2 nor greater than 10.

13. A convex micromirror array in which convex mirrors are arrayed longitudinally and laterally on an array surface, wherein when a longitudinal direction and a lateral direction of the convex mirrors are regarded as a longitudinal direction and a lateral direction of a convex mirror among the convex mirrors, the convex mirror has a cross-cylindrical convex surface composed of a combination of a convex surface that is cylindrical along the lateral direction throughout sections that are parallel to the longitudinal direction of the convex mirror and are orthogonal to the array surface and a convex surface that is cylindrical along the longitudinal direction throughout sections that are parallel to the lateral direction of the convex mirror and are orthogonal to the array surface, and a sag amount is corrected so as to increase an inclination of a skirt in each of meridians of the sections parallel to the longitudinal direction and meridians of the sections parallel to the lateral direction, wherein the meridians of the sections parallel to the longitudinal direction and the meridians of the sections parallel to the lateral direction are each composed of a conic curve of which the sag amount is corrected, and wherein in the following range of a horizontal coordinate x with its center on an axis of symmetry of the meridians, $$|x| \geq L/2 - \Delta x$$

a sag amount z is expressed as a conic curve corrected as indicated by the following equation, $$z = ((1/r) \cdot x^2 / 1 + \sqrt{1 - (1+k) \cdot (1/r)^2 \cdot x^2} + (x + \Delta x - L/2/\Delta x)^\gamma \Delta z)$$

wherein, $\Delta x$ and $\Delta z$ are expressed as follows, $$\Delta x = 0.1\alpha(\gamma + 1.2)\sqrt{0.375\lambda r}$$

$$\Delta z = \beta \lambda / 2$$

L is a width of the meridians, $\alpha$ is a real number no smaller than 0.5 nor greater than 2, $\beta$ is a real number no smaller than 0.15 nor greater than 0.6, $\gamma$ is a real number no smaller than 1 nor greater than 10, r is a radius of curvature of the conic curve, and $\lambda$ is a wavelength of a visible light ray.

14. A reflective screen comprising:

one of the concave micromirror arrays according to claim 11.

\*    \*    \*    \*    \*